US012558806B1

(12) United States Patent
Anderson

(10) Patent No.: US 12,558,806 B1
(45) Date of Patent: Feb. 24, 2026

(54) SYSTEMS AND METHODS FOR LOCKING ROTATABLE TOOLS

(71) Applicant: Brent L. Anderson, Yoder, WY (US)

(72) Inventor: Brent L. Anderson, Yoder, WY (US)

( * ) Notice: Subject to any disclaimer, the term of this patent is extended or adjusted under 35 U.S.C. 154(b) by 175 days.

(21) Appl. No.: 17/959,054

(22) Filed: Oct. 3, 2022

Related U.S. Application Data

(60) Provisional application No. 63/252,000, filed on Oct. 4, 2021.

(51) Int. Cl.
*B26B 11/00* (2006.01)
*B25G 3/38* (2006.01)
*B26B 1/04* (2006.01)
*F23Q 1/06* (2006.01)

(52) U.S. Cl.
CPC ................ *B26B 11/00* (2013.01); *F23Q 1/06* (2013.01); *B25G 3/38* (2013.01); *B26B 1/04* (2013.01); *B26B 11/003* (2013.01)

(58) Field of Classification Search
None
See application file for complete search history.

(56) References Cited

U.S. PATENT DOCUMENTS 1,357,398 A 11/1920 Haywood
1,614,949 A 1/1927 Finley
1,647,405 A 11/1927 Giesen
1,808,239 A 6/1931 Logan
2,461,941 A 2/1949 Sutton
2,530,236 A * 11/1950 Erickson ................ B26B 1/046 30/159
2,869,232 A 1/1959 Kivela
3,868,774 A 3/1975 Miori
4,040,181 A 8/1977 Johnson
4,170,061 A 10/1979 Henry
4,268,960 A 5/1981 Reinschreiber
4,272,887 A 6/1981 Poehlman
4,451,982 A 6/1984 Collins
4,541,175 A 9/1985 Boyd et al.
4,730,394 A 3/1988 Sonner, Jr.
4,893,409 A 1/1990 Poehlmann
4,918,820 A 4/1990 Korb et al.
5,060,379 A 10/1991 Neely
5,111,581 A 5/1992 Collins
5,293,690 A 3/1994 Cassady
5,325,588 A 7/1994 Rogers
5,400,512 A * 3/1995 Brush ....................... B26B 1/00 30/340

(Continued)

OTHER PUBLICATIONS

Spyderco, “Why the Round Hole?” (C) 2021 Spyrderco. 2 pages.

(Continued)

*Primary Examiner* — Hwei-Siu C Payer
(74) *Attorney, Agent, or Firm* — Santangelo Law Offices, P.C.

(57) ABSTRACT

A rotatable tool which may include a blade, handle, a multi-positional radially rotating placement system, a spring bias lock mechanism, and a user activated unlock mechanism, and the like. Methods of use thereof by a user or other persons, possibly for instances such as self-defense, survival, cutting, perforating, slicing, sawing, chopping, tradecraft, or the like are also included.

14 Claims, 13 Drawing Sheets

(56) References Cited

U.S. PATENT DOCUMENTS

| | | | | |
|---|---|---|---|---|
| 5,425,175 | A * | 6/1995 | Rogers | B25G 1/06 30/155 |
| D382,459 | S | 8/1997 | Khalsa | |
| 6,338,431 | B1 | 1/2002 | Onion | |
| 6,588,240 | B2 | 7/2003 | Anderson | |
| 7,017,234 | B2 | 3/2006 | Anderson | |
| 7,093,367 | B1 | 8/2006 | Huang | |
| 7,231,718 | B2 | 6/2007 | Outen | |
| 7,243,430 | B1 | 7/2007 | Lerch | |
| 7,536,788 | B2 | 5/2009 | VanHoy et al. | |
| 8,215,021 | B2 | 7/2012 | Seber et al. | |
| 8,959,779 | B2 | 2/2015 | Wen | |
| 9,259,845 | B2 | 2/2016 | Gringer et al. | |
| D828,137 | S * | 9/2018 | Qian | D8/99 |
| 10,247,230 | B2 | 4/2019 | McCullough | |
| 10,538,002 | B2 | 1/2020 | Korthuis | |
| 2006/0130278 | A1 | 6/2006 | Chen et al. | |
| 2006/0168818 | A1 | 8/2006 | Outen | |
| 2006/0260137 | A1 | 11/2006 | Flagg et al. | |
| 2008/0222895 | A1 | 9/2008 | Marfione et al. | |
| 2010/0175267 | A1 | 7/2010 | Seber et al. | |
| 2012/0023753 | A1 | 2/2012 | Wen | |
| 2012/0324738 | A1 | 12/2012 | Chu et al. | |

OTHER PUBLICATIONS

Youtube, Deadbolt vs Tri-Ad@ Lock | Knife Test, https://www.youtube.com/watch?v=uGDNSblccOY. Video dated Nov. 2, 2020.

Knife | INFORMER Pocket Knife Lock Types. Last Updated Sep. 4, 2018. 16 pages.

U.S. Appl. No. 63/252,000, filed Oct. 4, 2021. First named inventor: Anderson.

* cited by examiner

FIG. 5
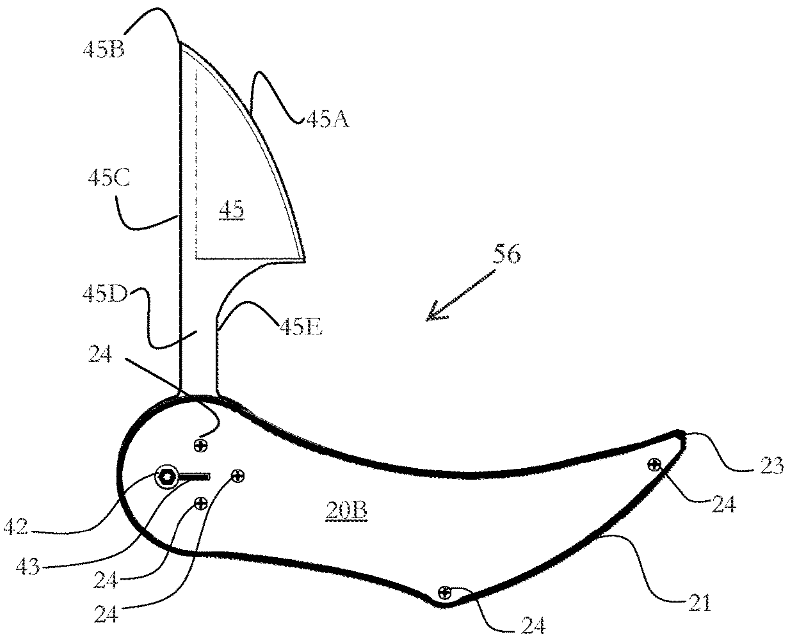
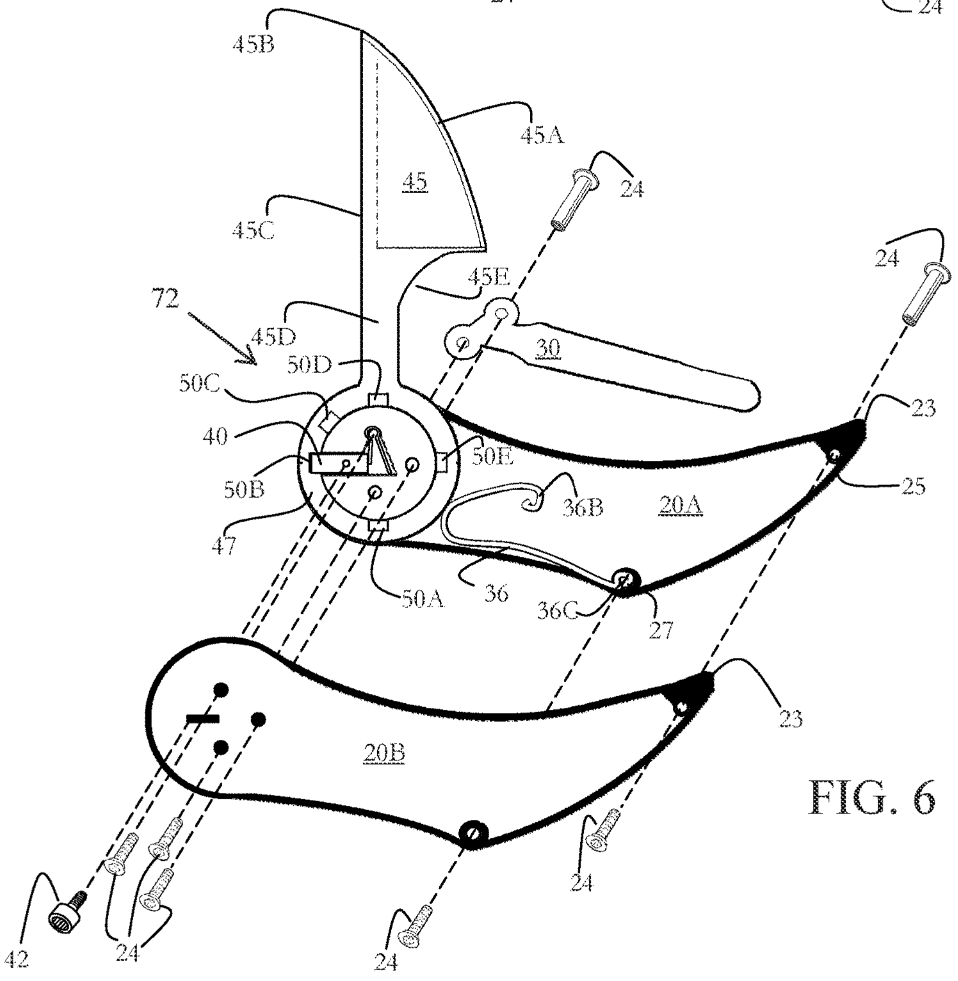
FIG. 6

SYSTEMS AND METHODS FOR LOCKING ROTATABLE TOOLS

CROSS REFERENCE TO RELATED APPLICATIONS

This is a U.S. Nonprovisional patent application claiming the benefit of and priority to U.S. Provisional patent application No. 63/252,000, filed Oct. 4, 2021, hereby incorporated by reference herein in its entirety.

TECHNICAL FIELD

The present disclosure may relate to folding tools and devices which may include a multi tool perhaps having a handle, and method of use thereof by a person for: self-defense; survival; meat cutting; general cutting, slicing, sawing, stabbing, and chopping; craftmanship; tradecraft; or the like.

BACKGROUND OF THE INVENTION

Tool devices with locking blades or safety catches may be popular with hunters, outdoorsman, factory workers, tradecraft persons, military, law enforcement, self-defense experts and the general public for many years. The term "every day carry" ("EDC") may often be used to describe such tools and may hint at their widespread use and popularity. Though EDC may be a fairly modern term that arose in use with on-line marketing, blogs, forums and product reviews, the desire for handy, readily accessible tools may date back decades if not possibly centuries. For example, U.S. Pat. No. 1,357,398 from 1920 describes a lock-blade pocket-knife that provides "a strong and inexpensive pocket knife which will stand any reasonable amount of hard usage . . . and shall be provided with means for locking the blade in either the open or closed position." Many design improvements and different locking mechanisms may have been sought and perfected over the years adding many unique and valuable improvements to these otherwise potentially simple mechanical devices and tools. Improvements may focus on improved safety, improved strength, improved affordability to consumers and manufactures, and improvements in the specificity of use and the overall esthetics, grip and handling of such tools, among others.

A You Tube video named "Deadbolt vs Tri-Ad® Lock | KNIFE TEST" (source: https://www.youtube.com/watch?v=uGDNSbIccOY) shows the testing and comparison of two commercially available lock blade knives. In the video, the cost, size, grip, durability and hinge strength are tested and compared. The locking hinges demonstrated and tested in this video may have been able to support hundreds of pounds of weight demonstrating the extreme advancements and improvements in the mechanics of locking blades well beyond the "reasonable amount of hard usage" claims of U.S. Pat. No. 1,357,398. Modern consumers, especially military, law enforcement, and self-defense users may want tools that will hold up and withstand extreme and perhaps somewhat unreasonable use and abuse, possibly due to the belief that one's life may someday depend on such a tool.

In the past, there have been improvements in the multi-functionality of tools that lock such as in U.S. Pat. Nos. 1,614,949 and 1,808,239. Others have evolved and improved movement and locking positions including U.S. Pat. Nos. 7,231,718 B2 and 9,259,845 B2 and US Pat. App. Pub. No. 2012/0023753 A1.

A website article, Pocket Knife Lock Types-Essential Guide to Lock Types, (source: https://knifeinformer.com/pocket-knife-lock-types/) may provide a review of lock types and knife tools.

However, there is a need to provide knife tools and devices with advancements perhaps in strength, safety and positional selectivity and ways to use such devices.

BRIEF SUMMARY OF THE INVENTION

The present disclosure includes a variety of aspects, which may be selected in different permutations and combinations based upon the particular application or needs to be addressed. In various embodiments, a lockable mechanism may permit a multi tool blade to be locked compactly and safely in a position including when closed. It may be configured to be locked into several open positions providing various angles in relationship to the handle.

It is an object of the present disclosure to demonstrate advancements in strength, safety and positional selectivity, as well as methods of use for tool devices, knife tool devices, and the like. A design may be unique in that it may limit the gross number of parts used to achieve the demands of strength, safety, and versatility compared to other existing art and technology. This may lower the manufacturing costs. In addition, embodiments may provide proprietary methods of use that match or link with the mechanical function of prescribed positive locking positions.

It is another object of the present disclosure to provide one-handed opening of a tool blade perhaps ambidextrously with the assistance of a tensioning mechanism that may spring the blade into an open position. A tensioning mechanism may be powerful enough to open the blade to any and/or all lock positions. Users may learn manual methods of timing the operation of a lock release, possibly so as to perfect locking the tool blade in each of the provided locking positions with proper practice and timing. Embodiments may allow for specific predetermined lock positions that may provide a blade verses handle angle configuration, possibly specific to different types of tool tasks. For example, a specific angle can be determined for maximum efficiency when skinning game. A game skinning angle can be calculated to provide maximum cutting power while possibly avoiding undesirable outcomes such as, for example, accidently puncturing the bowels of the game animal which can lead to meat spoilage. A self-defense angle can be determined to provide the maximum amount of grip and control of the tool while limiting the undesirable outcome of accidentally dropping the tool or have the tool wrenched from the hand by an assailant or anyone else, who could in turn use the tool against the victim or other innocent bystanders. There may be many methods of use angles that may be implemented and discovered with experimentation.

It is yet another object of the present disclosure to include improvements in strength, durability, and variety to tools including a decrease in manufacturing costs, among other goals. Mechanical engineering research may reveal various means of achieving an effective tool locking mechanism including, for example: positive and negative forces; friction; pins and misaligned catches; tensioning mechanisms; or the like. These may be used alone or in combination to provide effective lock mechanisms. The present application may achieve a mechanically superior configuration without the need for complex gear systems or an overabundance of moving parts, yet may provide a tool lock with positive force; negative force; force(s) distribution; friction; and compression and tensioning forces perhaps all in one design, as but a few non-limiting examples.

It is another object of the present disclosure to provide angles of various open positions which may correspond with various methods of use. Methods of use may include but are not limited to the use of a blade as a self-defense tool, the use of a blade for survival such as skinning and butchering game, the use of blades for tradecraft, craftsmanship, animal husbandry, the use of cutting blades or even saws, prying tools, screw drivers, puncture tools, files, sharpeners for ergonomically improved use, and the like.

Yet another object may include a hinge like feature which may be affected by movement of a blade perhaps having a round opening at one end where it may attach to a handle and may fit around a disk that may be affixed to a handle. A disk may contain voids or cutouts perhaps designed to accommodate a free-floating lock mechanism and even a tensioning mechanism that may push a locking mechanism with outward force into pockets or even grooves perhaps located on the inside circle of the blade.

The free-floating locking mechanism may be restrained by the two sides of the tool handle (which may be handle liners), the top and bottom of at least one of the disk voids, a tensioning mechanism on one end of the bar while the other end is possibly restrained by the inner wall of the blade's round opening. When the blade rotates the pockets or grooves on the inside circle of the round opening it may then line up with the bar which may be of adequate size to fit within said pockets or grooves, and may be forced into the pocket by tension and thus may create a locked blade. A free-floating bar may be manually manipulated by a pin, screw, or thumb stud for example, that may run intersectionally through the bar and one or both sides of the tool handle, thus possibly giving an operator control of the internal locking mechanism possibly by using manual force to overcome the tensioning mechanism and can freely rotate the blade around the disk.

In yet other objects, a multi tool may be used in which part of a tool can be folded into a handle. Such part of a tool may be a blade, saw, file, awl, screwdriver, or the like.

Naturally, further objects, goals, and embodiments of the application are disclosed throughout other areas of the specification, claims, abstract, and drawings.

BRIEF DESCRIPTION OF THE FIGURES

FIG. 5 is a non-limiting example of an alternate view of a tool blade according to some embodiments.

FIG. 6 is a non-limiting example of an alternate internal exploded view of a tool blade according to some embodiments.

DETAILED DESCRIPTION OF THE INVENTION

Figure 1A:
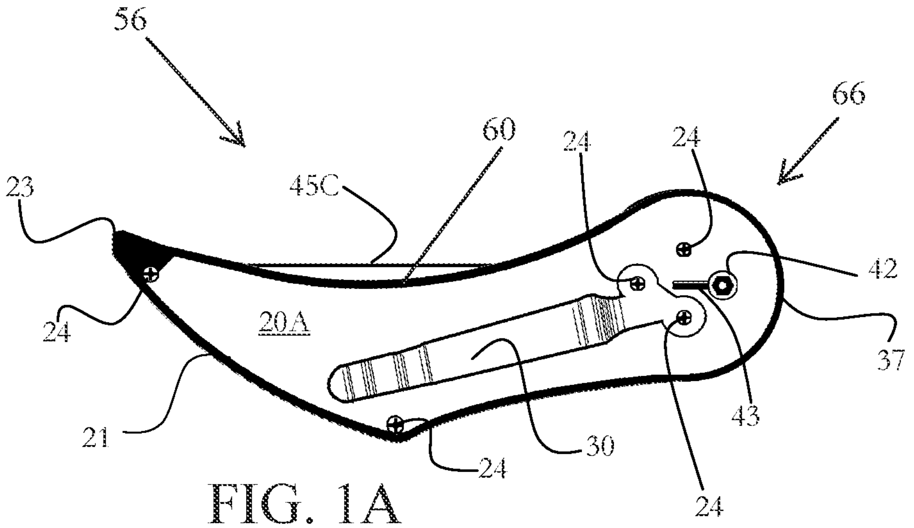
FIG. 1A is a non-limiting example of a back view of a tool blade according to some embodiments.

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the application may include a rotatable tool comprising a handle; a blade; a fastener between said handle and said blade; a multi-positional radially rotating placement system of said blade with respect to said handle configured to allow rotational positioning of said blade in relation to multiple positions around said handle; a spring bias lock mechanism configured to lock said blade to said handle at a secured position; a user activated unlock mechanism of said spring bias lock mechanism; and perhaps even a spring bias release of said blade from said locked position configured to spring said blade open when said user activated unlock mechanism is activated. Other embodiments may provide a method for adjusting a tool comprising the steps of providing a blade in a first secured position relative to a handle of a tool; providing a user activated unlock mechanism, part of which is accessible by a user on an outside of said handle of said tool, wherein when said user activated unlock mechanism is activated by said user, said user activated unlock mechanism unlocks said blade from said first secured position; springing said blade from said first secured position relative to said handle to one of at least two other positions relative to said handle, wherein said positions are radially placed around said handle; and perhaps even locking said blade in said other position with a spring bias lock mechanism.

A tool may be a multi tool in which part of a tool can be folded into a handle. A blade may be folded into a handle and a blade may include but is not limited to a knife blade, saw, file, awl, screwdriver, corkscrew, or the like.

A rotatable tool (56) or methods for adjusting a tool may include a handle (20), a blade (57), a fastener (24) between a handle and a blade, and even a multi-positional radially rotating placement system (58) of the blade with respect to a handle configured to allow rotational positioning of the blade in relation to multiple positions around a handle. A blade may be radially moveable (63) around a disk. A spring bias lock mechanism (59) may be provided and may be configured to lock a blade to a handle at a secured position (72). A user activated unlock mechanism (42) may be provided which can unlock a spring bias lock mechanism. A tensioning mechanism (36) which may be a spring bias release of a blade from a locked position may be provided and may be configured to spring a blade open when the user activated unlock mechanism is activated. A tool may provide a blade in a first secured position and when a user activates a user activated unlock mechanism, part of which may be accessible by a user on an outside of a handle of a tool, the user activated unlock mechanism may unlock the blade from a first position. A blade may then be moved, even sprung, from a first secured position to another position such as one of at least two other positions. A blade position may be radially placed around a handle. Once in a new position, a blade may be locked into the new position perhaps with a spring bias lock mechanism.

Embodiments of the technology provide: a handle (20) which may include two parts, a front side (20A) of a handle (20) and a back side (20B) of a handle (20) which may be configured to fit together and even enclose an end of a blade; a curved edge (21) of handle that may accommodate a thumb rest and/or improved grip for various actions; a disk (22), which may be part of a hinge mechanism, perhaps with holes which may be for fastening to handle(s) and perhaps with voids to accommodate tensioning mechanisms and locking mechanisms; a pressure point tip (23); fasteners (24) perhaps to hold two handles together and secure inner mechanisms; holes (25) perhaps to accommodate fastener such as screws for holding handles together; a hole (27) perhaps to accommodate fastener plus secure a tensioning mechanism (36) such as a spring bias release which may be one end of a spring; a hole (29A) which may fasten a handle to a disk, a disk may be capable of housing a spring bias lock mechanism such as holding a tensioning mechanism in place and a disk may be located adjacent to a cutout with locking grooves of a blade, and a pocket clip to handle; a handle or at least part of a handle may be connected to a disk with an attachment (24) which can be attached to part of a blade; a hole (29B) which may hold disk to handle(s) and pocket clip to handle(s); a hole (29C) which may hold disk to handle(s) and pocket clip to handle(s); a pocket clip (30) perhaps for convent carry and access; a void (32) which may be a cut out which may accommodate a tensioning mechanism (34); a second void (33) in a disk (22) which may accommodate a spring bias lock mechanism (59); a tensioning mechanism (34) such as a spring perhaps for asserting pressure on a moveable component (40) such as a locking bar; a space (35) perhaps to accommodate movement of a tensioning mechanism (36) such as a spring bias release; a tensioning mechanism (36) such as a spring bias release which may be a spring exerting outward force against part (45D) of a blade (45); a point of contact (36A) between a tensioning mechanism (36) which may be a spring exerting outward force against part (45D) of a blade (45D) perhaps while at the same time creating a minimal amount of drag against a round shape or round end (47) perhaps to provide for a smooth feel while opening and closing; an end (36B) of a point of contact (36A) perhaps designed in such a way not to grab or catch on part (45D) of a blade (45); a second (36C) of two ends (36B, 36C) of a point of contact (36A) perhaps designed to fasten to a hole (27) and a screw; a rounded end or edge (37) of handle perhaps to accommodate a thumb rest and improved grip for various actions; a sharpened or sheer inside edge (38) (perhaps protected from contact with fingers) which may include notches, grooves, cut outs and the like to provide for different interactions with the blade (45) and may create new and useful tools which may include: scissors, seat belt cutter, letter opener, wire striper, wire cutter, cigar trimmer, scoring device, plastic/composite handcuff cutter, game skinning tool, gutting tool for fish and fowl, any number of other uses, or the like; a moveable component (40) may be a free floating lock bar, cylinder, shim, or the like perhaps for creating a lock when engaged by a tensioning mechanism (34); a hole (41) perhaps for a user activated unlock mechanism (42) to pass through and attach; a user activated unlock mechanism (42) which may have an attachment (65) such as a thumb stud, pin, screw, bolt, button or the like connected to a moveable component and may be perhaps be used for manual manipulation of a spring bias lock mechanism (59); a hole (43) which may be a cutout in a handle may provide space for a user activated unlock mechanism (42) to move back and forth; a blade (45); a sharpened edge (45A) of a blade (45); a pointed tip (45B) of a tool blade (45); a spine or unsharpened edge (45C) of a blade (45); a part (45D) of a blade (45) closest to handle but outside of the handle, perhaps designed to accommodate the space next to or in between a user's fingers for comfort and/or safety and/or better grip and/or better dexterity of handling; space (45E) between the sharpened edge of the blade and the handle for the flesh of the hand and fingers perhaps to rest without damage or injury and may provide a surface for the tensioning mechanism (36) to make contact when in the closed position (66); a round shape (47) of the blade (45) which can allow for a round opening for part of the locking structure and movement of blade (45) into various moving and locked positions; an inside (47A) of a round end (47) which may have a smooth surface and may have a locking groove (50) which may be a groove, pocket, notch, void, indent, or the like to accommodate and restrain a spring bias lock mechanism (59) or acceptance of a spring bias lock mechanism (59) to create a locked structure; an outside (47B) of a round edge (47) which may be designed with groves, pockets or other shapes perhaps to accommodate increased functions or dual functions of locking or grip or both; an outside (47B) may be a shape such as a circle and may mirror the shape and size of handle end (37) or it may be offset, different shape and/or different size perhaps to create new functions or additional tools such as a lanyard hole, wire stripper, bottle opener, protrusion tool, knob for guiding the blade between locking positions and/or other shapes and tools that could not unnecessarily interfere with the user's grip of the handle, or the like; a cutout (48) which may be a hole, space, or the like and which may provide space for disk (22); a locking groove (50) which can allow for the acceptance of a spring bias lock mechanism (59) to enter and even a secure locking manner; allows a spring bias lock mechanism (59) to enter and keeps the blade in various positions. For example, a locking groove (50A) may provide a closed secure position of a blade in a handle; a locking groove (50B) may provide a tool end at a desired angle for use such as a punch blade tool; a locking groove (50F) may provide a spark igniter (52) which may simulate a spark and fire created by contact between a locking groove (50F) and a spring bias lock mechanism (59); any combination or permutation thereof; or the like. A spark igniter (52) may be part of a spring bias lock mechanism.

A spring bias lock mechanism (59) may include a moveable component (40) and a tensioning mechanism (34) such as a spring or the like. A moveable component (40) may be moveable connected to a handle and may be a free floating obstruction such as but not limited to a free floating bar or the like. A handle may cover all (64) of a handle attachable unexposed portion of a blade such as shown in FIG. 6.

A blade tool may be designed to achieve certain defenses such as but not limited to depart, distract, disable, damage, death, or the like. Depart or even diffuse may be a good option in a confrontation. A pocket clip of a tool may keep it secure but handy in case of attack. Distract may be implemented with a tool perhaps so that a pressure point tip can provide a non-lethal option to discourage an attacker. Disable may provide a less than lethal option such as a face buster, rib breaker, groin smasher, or the like. A tool may provide damage and death such as with slicing, slashing, and even penetration power to defend from an attacker. Such tools may be useful tools for a variety of everyday situations such as hunting, camping, outdoor activities, opening the mail, or the like. Additional options may include a speed flip open capability for a folded blade to be readily opened and even a reverse grip thumb rest or the like.

Figure 1B:
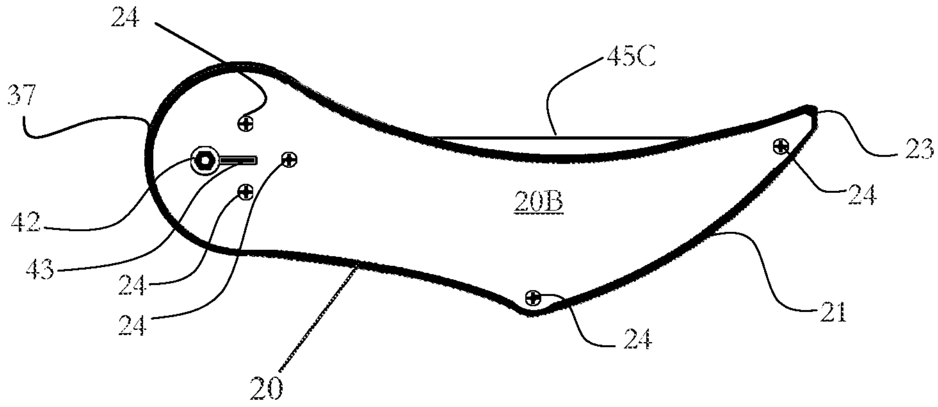
FIG. 1B is a non-limiting example of a front view of a tool blade according to some embodiments.

As shown in FIGS. 1A and 1B, embodiments may include a tool having a handle and a blade. A handle (20) may be one part or in some embodiments, may be two or more parts (20A, 20B). A first side of the lock blade may include a part of a handle (20A). As shown in embodiments, a handle may have a pressure point tip (23) may also be included and may act as a non-lethal pressure point self-defense tool. A handle may also have a circular base (37). A tip (23) may be made of a hardened material which may be sufficient for use as an emergency tool to break glass or other material, as but a few non-limiting examples. A curved edge (21) may be located proximate of the tip (23) and opposite of a space (35) which may be a pocket (shown in other figures) which may contain a blade (45) in a closed position and a tensioning mechanism (36) such as a spring bias release and may contain other components, tools, blades, magnets and the like not shown in the drawings. A curve up to a tip (23) and may include a device which may be designed as a thumb rest (60) for thrusting the tip (23) in a forward stabbing motion, or may be held in the reverse position with the tip (23) protruding out of a clasped hand on a desired side of a user's hand and may therefore be designed as a hammer first or reverse sticking motion from the wielder to use the tip (23) or rounded edge (37) as a nonlethal pressure point tool or as a non-lethal striking tool in instances such as self-defense. Handles (20A, 20B) can include handle liners which may be common in knife production and may mimic the size and shape of the handles and may also add extra strength. A fastener or fasteners (24) such as screws, nails, or the like may be used at various points to attach the device together. A blade (45) may be configured of various sizes and shapes to accomplish a variety of desired uses. A blade may have an exposed blade end portion (61) and handle attachable unexposed end portion (62). A handle attachable unexposed end portion may have a round shape. A user activated unlock mechanism (42) may provide a manual method to unlock the blade (45). Once unlocked, a blade (45) may be folded and locked into various positions perhaps as allowed by an inner locking mechanism. A hole (43) such as an opening may be proximate to a user activated unlock mechanism (42) and may be of a sufficient size and length to allow the user activated unlock mechanism (42) to move freely, and may also be of a sufficient size to prevent dirt and other debris from collecting in and around the locking mechanism. A clip (30) may be included and may be made of a flexible and durable material which may allow for convenience and comfortable carry of the lock blade. The clip (30) may be configured to be clipped or adorned to a user or a user's clothing or bag, as but a non-limiting example.

FIG. 1A is an exemplary view of a side of a handle (20A) of a tool (56) may depict one side of a possible handle shape and configuration which may be made of material of sufficient durability and rigidity. A handle (20) may be made in a variety of shapes and in some embodiments may allow a blade to be folded into a handle (20). In some embodiments, a handle may include two pieces (20A, 20B). A handle may provide for folding of a blade or blades into the handle or in between two pieces of a handle (20A, 20B) and a blade may be moved around a handle (20) perhaps in various locking and free-floating positions. An edge (21) of a handle may be of an exemplary shape of handles that may be configured to provide a thumb rest when holding the tool in a reverse grip position (e.g., a blade sticking out past the pinky finger side of a hand) and can also provide an ergonomically beneficial curve for improved grip when the tool is in a typical grip position (e.g., the blade sticking out of the first between the thumb and fore finger). A rounded edge (37) may be another exemplary shape component of a tool (56) or a handle thereof that may be incorporated to alternately provide a thumb rest position when the blade is locked at different points in relation to the handle as well as possibly providing an ergonomically beneficial shape for gripping and handling the tool in different positions and methods of use. The ergonomically beneficial shape may aid as a safety feature for a handler to prevent injury and unintentional slipping or dropping of the tool. The tip (23) of a handle (20) may be produced in a smaller diameter so as to be possibly be used as a non-lethal pressure point tool in self-defense methods of use or possibly as a tool for smashing, puncturing and/or breaking objects. Examples may include but not be limited to, puncturing drink or food packaging, smashing or breaking objects too hard or durable for the human hand to smash without injury, and/or use as an escape tool such as smashing glass to escape through a window during a crisis event. A clip (30) shows an example of a part that may be affixed to or may be a part of a tool such as to a handle that could provide a convenient method of everyday carry for the tool. Such a part may be clipped to a pants pocket, belt, purse strap/pocket, backpack strap/pocket or other convenient places of carry. Holes (not shown) may be made in a handle perhaps for other methods of carry such as use with a carabiner, string, chain, cables, ropes, and the like. Such attachments may also be used as a wrist strap to prevent dropping or losing the tool. Fasteners (24) may be used to restrain a variety of parts in place and may hold parts together. Examples include holding a handle or sides of a handle (20A and 20B) together along with handle liners (not shown), holding a clip (30) securely in place, and/or holding other internal parts in place perhaps to prevent movement (shown in other figures), or the like. A spine or even an unsharpened edge (45C) may be located on a back part of a tool blade, in the case a blade with a blunted unsharpened edge which may be opposite the sharpened edge. A user activated unlock mechanism (42) may be used as a manual means of unlocking the blade (45) from various locking positions. A user activated unlock mechanism (42) may be a pin of varying shapes, sizes and lengths. A hole (43) can allow for the movement of a user activated unlock mechanism (42) and its parts.

FIG. 1B is a non-limiting example of a front view of a tool blade depicting one side of a possible handle shape and configuration which may be made of material of sufficient durability and rigidity. A handle may be made in a variety of shapes that can provide for folding of a blade or blades into the handle and around the handle in various locking and/or free-floating positions. A handle may be made of two parts (20A, 20B). A curved edge (21) may be an exemplary shape of a handle (20) and may be incorporated to provide a thumb rest when holding a tool in a reverse grip position (e.g., the blade sticking out past the pinky finger side of a hand) as well as provide an ergonomically beneficial curve for improved grip when the tool is in a what may be a typical grip position (e.g., the blade sticking out of the first between the thumb and fore finger). A handle edge (37) may have a shape component of a handle that may be incorporated to alternately provide a thumb rest position, possibly when the blade is locked at different points in relation to the handle, as well as possibly providing an ergonomically beneficial shape for gripping and handling the tool in different positions and methods of use. The ergonomically beneficial shape may also aid as a safety feature for the handler to prevent injury and unintentional slipping or dropping of the tool, among other possible benefits. A tip (23) of a handle may be produced in a smaller diameter so as to possibly be used as a non-lethal pressure point tool in self-defense methods of use or possibly as a tool for smashing, puncturing and/or breaking objects. Examples may include but are not limited to, puncturing drink or food packaging, smashing or breaking objects that may be too hard for a human hand to smash without injury, use as an escape tool such as smashing glass to escape through a window during a crisis event, among other possible examples. Fasteners (24) such as screws may be used to restrain a variety of parts in place and hold parts together. Examples include holding a handle (20A and 20B) together along with handle liners (not shown), holding a clip (30) securely in place, holding other internal parts in place to prevent movement (shown in other figures), and other possible goals. An unsharpened edge (45C) of a blade (45) may be provided perhaps in the case a blade with a blunted unsharpened edge which is opposite the sharpened edge. A user activated unlock mechanism (42) may be used as a manual means of unlocking the blade (45) from its various locking positions. A user activated unlock mechanism (42) as shown, may alternately be any component, such as a thumb stud, pin, button, bar, of varying shapes, sizes and lengths, or the like. A hole (43) allows for the movement of a user activated unlock mechanism (42) and its parts.

Figure 2:
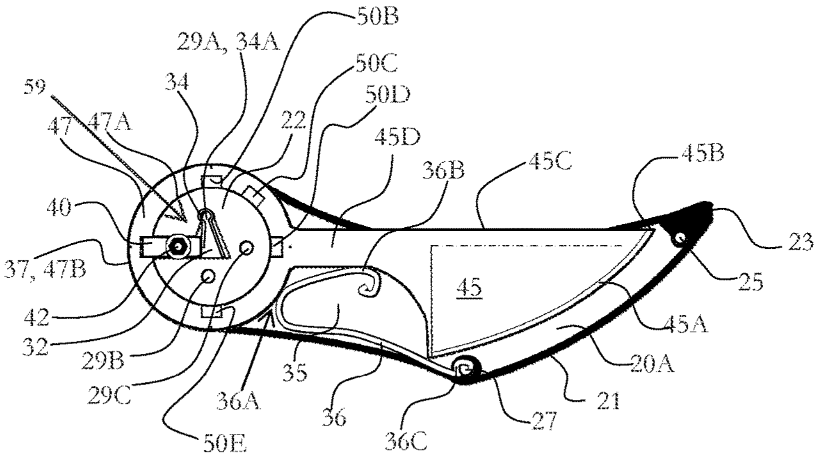
FIG. 2 is a non-limiting example of an internal view of a tool blade according to some embodiments.

As shown in FIG. 2, embodiments may include a tensioning mechanism (36) which may be a spring bias release or spring which may be configured of a spring exerting outward force (36A, 36B) against a blade and blade components. A tensioning mechanism (36) may provide springing of a blade from a secured position to another position since a tensioning mechanism (36) may be biased against part of the blade. This may occur while also creating a certain amount of drag against a portion of a rounded edge (47) of a blade (45). The rounded edge (47) of the blade (45) may also allow for a round opening to form part of the locking structure. The tension mechanism may have a distal end (36B) which may designed in manner to reduce grabbing or catching any part of a blade (45). A second distal end (36C) may be included and secured in a hole (27) and be where a tensioning mechanism (36) may be secured to the device. In some embodiments, the outside of a blade (45) may be design with grooves, indentations, or other shapes to accommodate increased or dual functions. The blade (45) may include an inner element (47A) which may be designed as a smooth surface with grooves, pockets, or the like, possibly to accommodate an acceptance and possible restraint of a spring bias lock mechanism (59) which may include a moveable component (40) such as a free-floating lock bar. A free-floating lock bar may also be designed as a cylinder, or a shim for creating a lock, possibly when engaged by a tensioning mechanism (34) for asserting pressure on a moveable component (40).

FIG. 2 shows a non-limiting example of a blade (45) and its components in an exemplary closed position; components may include a sharpened edge (45A), a tip (45B), an unsharpened edge (45C) which may be a back of blade or spine, and a space (45E) which may be a safety area to accommodate a user's fingers for comfort and/or safety and/or better grip and/or better dexterity of handling, as but a few examples. This space or safety area of a blade may provide a choke up position perhaps for grasping and even handling a tool which may improve fine motor skills for tasks such as but not limited to carving, whittling, skinning game, arts and crafts, leatherwork, and the like. Such choke up position may allow a user to grasp more of the blade of a tool instead of just grasping the handle. A tensioning mechanism (36) which may be a spring bias release and its component may interact with a blade (45) which may provide for quick and/or easy opening. Components of a tensioning mechanism (36) which may be a spring bias release may include a contact point (36A), an end (36B) and an opposite end (36C). A contact point (36A) may interact with a rounded end (47) of a blade to possibly provide drag friction that may be used in conjunction with the force produced by a spring bias release to possibly balance, control, and/or otherwise stabilize movement of blade (45), possibly as it springs open. It may also provide friction, control, and/or other stabilization as a blade (45) moves between various locking positions and back to the closed position. A contact point (36A) may also provide a bend in the tensioning mechanism (36) which acts as a point for the mechanism to turn back upon itself. In some exemplary embodiments, an end (36B) may be fashioned with a crimp, bend, or other beaded-type shape to possibly provide smooth interaction with a blade (45) and possibly prevent scratching, gouging, or catching. An opposite end (36C) may act as an anchor point and may be attached to the handle(s) (20A) or (20B) by various means including possibly a hole (27) similar in size to hole (25) for screws to pass through. A space (35) may be made to accommodate various shapes, sizes and types of spring bias releases.

A disk (22) may interact with handles (20A) and/or (20B) by being attached to one or the other, or both. A disk (22) may possibly be made with a void (32) to accommodate a tensioning mechanism (34), another void that may accommodate a moveable component (40) and may be made with any number of holes such as (29A), (29B) and (29C). A moveable component (40) may be a lock bar, shim, cylinder or the like. Holes (29B) and (29C) may line up with twin holes in handles (20A) and/or (20B) and may also line up with holes in clip (30), as shown in FIG. 1. These holes may accommodate screws or other like fasteners. A hole (29A) may function in much the same way as holes (29B) and (29C) but may in addition line up with hole or curve (34A) which may assist in the restraint of tensioning mechanism (34). A rounded end (47) of blade (45) may include an inside (47A) end and an outside (47B) end. An inside end (47A) may be an inside circle of a blade (45) may be located opposite the outside end (47B) which may be an outside circle which may be designed with groves, pockets, or other shapes to accommodate increased functions or dual functions of locking or grip or both. An outside circle (47B) may mirror the shape and size of handle end (37) or it may be offset, made in different shapes and/or sizes to create new functions or additional tools such as a lanyard hole, wire stripper, bottle opener, protrusion tool, knob for guiding the blade between locking positions and/or other shapes and tools that would not unnecessarily interfere with the user's grip of the handle.

A multi-positional rotating blade placement system may provide securement of a moveable component into one of a plurality of locking grooves. Such securement may provide a blade in a secure position such as a first secure position in which a spring may be biased against a moveable component for securement. An inside circle (47A) may encircle a disk (22) and may act as a surface for a restraining moveable component (40) against a force that may be provided by a tensioning mechanism (34). An inside circle (47A) may also provide varying degrees of friction through contact with a moveable component (40). An inside circle (47A) may have one or more locking grooves (50A, 50B, 50C, 50D, 50E) or the like to accommodate a moveable component (40) in a locked position or may have a position of limited or prescribed movement. A locking groove (50A) may be a pocket, notch, indent, ridge, or the like. Locking grooves (50A, 50B, 50C, 50D, 50E) are shown here and a different kind of locking groove (50F) is shown in FIG. 10. Holes (25, 27) may accommodate screws (24) or other fasteners. A curved edge (21) may be located proximate of the tip (23) as shown in FIG. 1 and elsewhere. A user activated unlock mechanism (42) is shown but will be explained in detail in FIG. 7.

Figure 3:
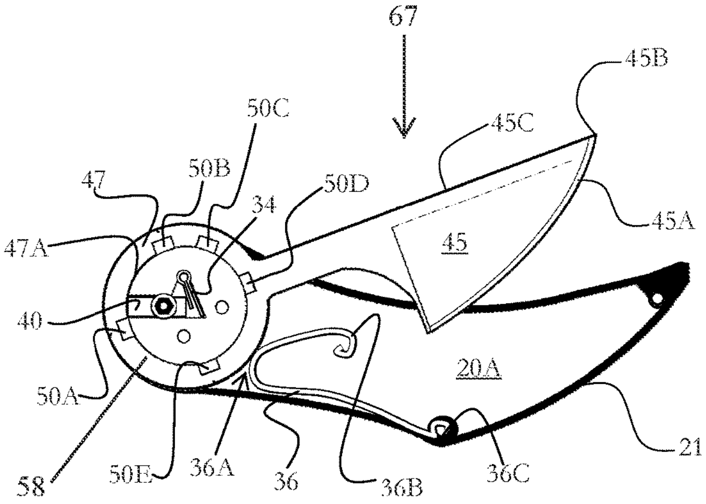
FIG. 3 is a non-limiting example of an alternate internal view of a tool blade according to some embodiments.

As shown in FIG. 3, embodiments of the disclosure may include a tensioning mechanism (36) such as a spring bias release which may be configured of a spring exerting outward force (36A, 36B) against a blade and blade components. This may occur while also creating a certain amount of drag against a portion of a rounded edge of a blade (47). The rounded edge of the blade (47) may also allow for a round opening to form part of the locking structure. A tension mechanism may have a distal end (36B) which may be designed in manner to reduce grabbing or catching any part of a blade (45A, 45B, 45C, 45D). A second distal end (36C) may be included and secured in a hole (27) and be where a tensioning mechanism (36) such as a spring bias release may be secured to the device disclosed herein. In some embodiments, the outside of a blade (47) may be designed with grooves, indentations, or other shapes to accommodate increased or dual functions. A blade may include an inner element (47A) which may be designed as a smooth surface with grooves, pockets, or the like, possibly to accommodate an acceptance and possible restraint of a moveable component (40) such as a free-floating lock bar. A free-floating lock bar may also be designed as a cylinder, or a shim for creating a lock, possibly when engaged by a tensioning mechanism (34) for asserting pressure on the moveable component (40). FIG. 3 demonstrates a blade (45) in a partially open position (67) with moveable component (40) shown restrained in a void (33) pressed against tensioning mechanism (34) which is shown in a compressed configuration. A user activated unlock mechanism may allow a user to apply force to push a moveable component against a biased spring so that the moveable component can be released from a locking groove. After release, a blade may be able to rotate freely and even moved into a different position.

FIG. 3 shows all elements from FIG. 2 and also illustrates the interaction of a moveable component (40) with a tensioning mechanism (34), an inner circle (47A), a tensioning mechanism (36) such as a spring bias release and a contact point (36A) which may provide drag or fiction when the blade (45) may be in motion between possibly predetermined locking positions. Locking positions may include positions of fixed non-motion, or limited motion, or otherwise.

Figure 4:
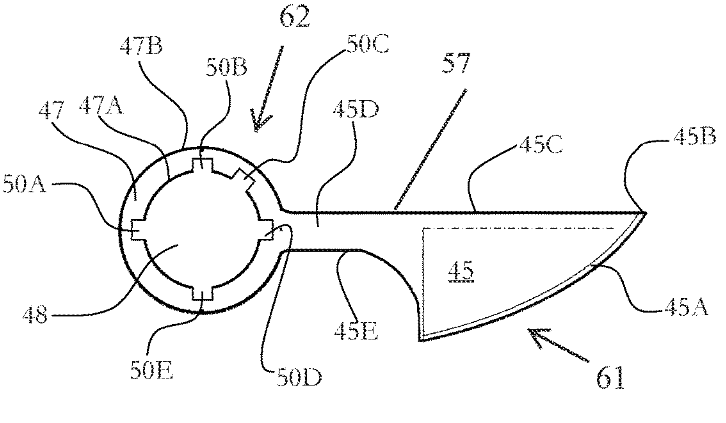
FIG. 4 is a non-limiting example of an alternate internal view of a tool blade according to some embodiments.

As shown in FIG. 4 embodiments of the disclosure may include a blade (45) removed from the rest of the structure to better see its components. A blade (45) may include any type of tool such as but not limited to a screwdriver, corkscrew, cutting tool, knife blade, blade, saw, file, awl, prying tool, marking tool, leather working tool, animal husbandry tool, gardening tool, or the like. FIG. 4 shows an exemplary blade (45) that may be used as a cutting tool or self-defense tool which may consist of a circular base (47B), sharpened edge (45A), tip (45B), a spine (45C) which may be an unsharpened edge (45C), a part of a blade (45D) such as a ricasso, tang, or the like, and a space (45E) in a blade which may be a finger groove. The end of the tool blade (45) such as part of the handle attachable unexposed end portion (62) may include a circular portion (47), inside end (47A), a cutout (48) perhaps to accommodate interaction or attachment with other components, and even locking grooves (50). A cutout of a blade may be a circular cutout and locking grooves may be radially placed around a circular cutout. Inside end (47A) may have locking grooves (50). A locking groove may be a pocket, groove, ridge, space, or the like which can provide interaction with a moveable component (40) shown in other figures. Multiple locking grooves (50A, 50B, 50C, 50D, 50E) may be provided.

FIG. 4 shows a blade (45) and components as described in FIG. 1 and FIG. 2 removed from the handles and locking structure to give a better view of a non-limiting example of a blade (45) shape. A sharpened edge (45A) may be a single sided cutting edge, as shown, or a multisided cutting edge which may include different angles, curves, hooks, serrations, tool heads such as screw drivers or can openers or the like. A spine or unsharpened edge (45C) may be removed in favor of a double edge mirroring the tool blade (45A) or may be of different thicknesses and shapes and may have tool functions separate from or complementary to edge (45A). The portion of the blade (45D) closest to the handle can be of different thicknesses and shape, and may have tool functions separate from or complementary to a sharpened edge (45A). A space (45E) between the sharpened edge of the blade and the handle can be of different thicknesses and shapes and may have tool functions separate from or complementary to the sharpened edge (45A).

An outside circle (47B) may be made as a hexagon, heptagon, octagon, nonagon, decagon or other shapes and may have different textures, grooves, protrusions, or the like perhaps to aid in different tool functions, grip, ergonomics and/or esthetics. An inside circle (47A) may have different textures, grooves, indentions to aid in different tool functions, lock functions, scissor action functions, and various degrees of friction functions which may include a spark creator on a tool for starting fires.

FIG. 5 shows a blade (45) in an open position (66) which may correspond with methods of use as a self-defense tool or cutting tool, or any other desired use. As shown in FIG. 5, embodiments may include handles (20A) and (20B) fastened together with fasteners (24) with blade (45) in an opened position. This open position may allow a person to grip the handle in such a way that tool blade (45) may protrude between the pointer finger and middle finger where a ricasso (45D) may make contact with the pointer finger and a space (45E) may make contact with the middle figure while the rest of the fingers of a first may cover the handles (20A) and (20B). Such a grip may be useful for self-defense as it may make it difficult for the tool to be wrenched from the hand or dropped. In such a grip, a pressure point tip (23) may be the only part of the handles (20A and 20B) exposed which may provide both a non-lethal self-defense tool as well as more serious, potentially lethal tool blade (45) in a locked and secure position. This grip position may provide a full first grip which may be easier to use as a self-defense tool by allowing the wielder to use various methods of use including punching like a boxer. A user activated unlock mechanism (42) may be used for quick and easy release of the blade (45) into various positions described herein.

As shown in FIG. 6, embodiments may include the elements shown in a partially exploded view of one configuration. A handle (20B) is removed, showing how fasteners (24) may connect various parts including but not limited to handles (20A) and (20B), disk (22), clip (30), tensioning mechanisms (36) and (34). A user activated unlock mechanism (42) may also go through space (43) in handles (20) and may be secured to or pass through a moveable component (40).

FIG. 6 shows a non-limiting example of how the fasteners (24) such as screws may line up with holes (25, 27, 29A, 29B, 29C), a tensioning mechanism end (34A), and tensioning mechanism end (36C). A user activated unlock mechanism (42) may line up with a hole (41) in a moveable component (40) including passing through a handle (20A, 20B) to be accessible from one or both sides.

Figure 7A:
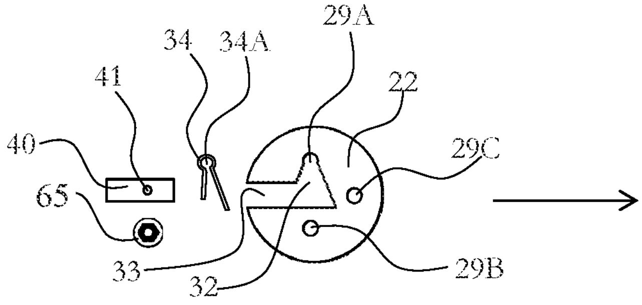
FIG. 7A is a non-limiting example of an alternate internal exploded view of a disk and locking components according to some embodiments.
Figure 7B:
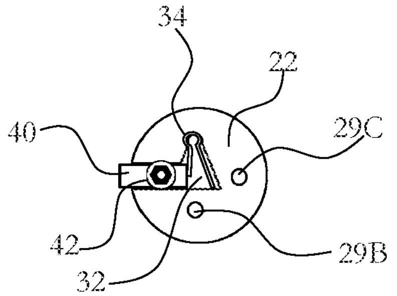
FIG. 7B is a non-limiting example of an assembled alternate internal exploded view of a disk and locking components as provided in FIG. 7A according to some embodiments.

As shown in an exploded view in FIGS. 7A and 7B, embodiments of the disclosure may include a locking feature composed of disk (22), moveable component (40), tensioning mechanism (34), a user activated unlock mechanism (42), and perhaps even holes (29A, 29B, 29C). Holes may be created in disk (22) perhaps to provide means to attach to a handle (20) to the disk. A void (32) and (33) may be created in a variety of shapes to accommodate the moveable component (40) and tensioning mechanism (34). The head (34A) of tensioning mechanism (34) may be made to receive fasteners shown in other figures perhaps to help keep it secure. FIG. 7B shows an example of how all these parts may fit together into one mechanism. FIG. 7A is a non-limiting example of an alternate internal exploded view of a disk (22) and locking components according to some embodiments; holes (29A, 29B, and 29C) may be placed to couple a disk (22) to either side of a handle (20A, 20B). A hole (29A) may be used to fasten a handle to a disk and hold a tensioning mechanism in place which may be part of or separate from a void (32) and may also accommodate a tensioning mechanism end (36A) which may allow it to be secured in the void and with a fastener (24). FIG. 7B is a non-limiting example of the embodiment of FIG. 7A as assembled.

Figure 8:
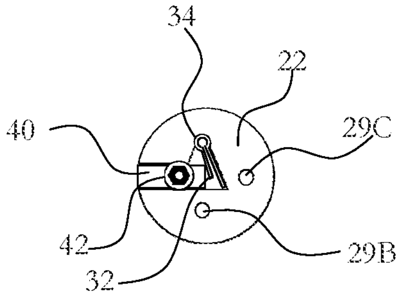
FIG. 8 is a non-limiting example of an alternate internal view of a disk and the locking components according to some embodiments.

As shown in FIG. 8, embodiments may include those as described in FIG. 7B with tensioning mechanism (34) shown in a compressed position. FIG. 8 is a non-limiting example of an alternate internal view of a disk (22) and the locking components according to some embodiments; specifically showing how a tensioning mechanism (34) may move within a void (32) which may allow a moveable component (40) such as a bar to move in and out of desired positions. A tensioning mechanism (34) is shown compressed against tension.

Figure 9:
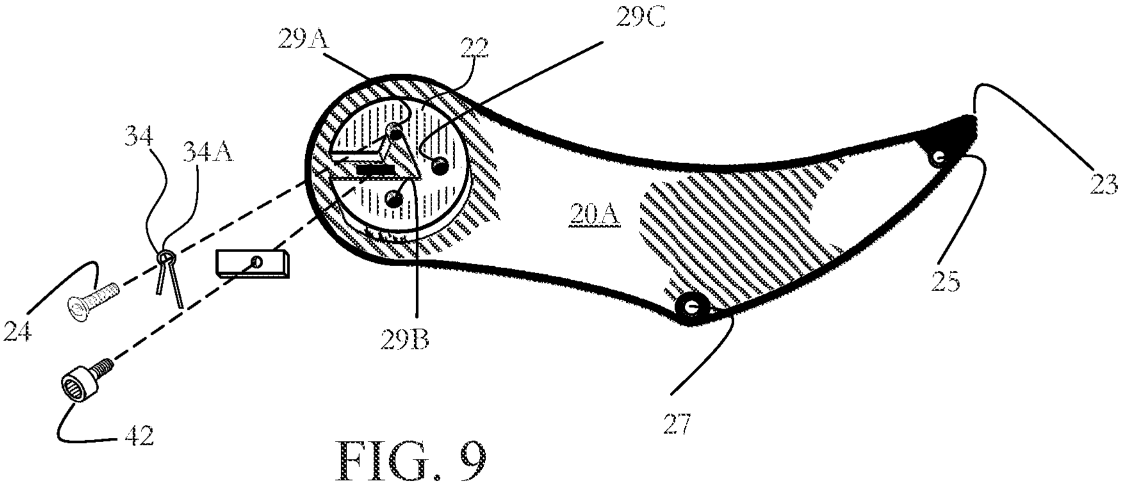
FIG. 9 is a non-limiting example of an alternate view of a tool according to some embodiments.

FIG. 9 is a non-limiting example of an alternate view of a tool according to some embodiments; showing how a disk (22) and a handle (20) may be formed as one part. FIG. 9 provides non-limiting examples where parts such as (20A) and disk (22) may be combined into one solid part. This may also limit the need for holes (29A), or (29B) o(29C) and may provide alternate means of securing parts of a handle (20A) and (20B) together.

Figure 10A:
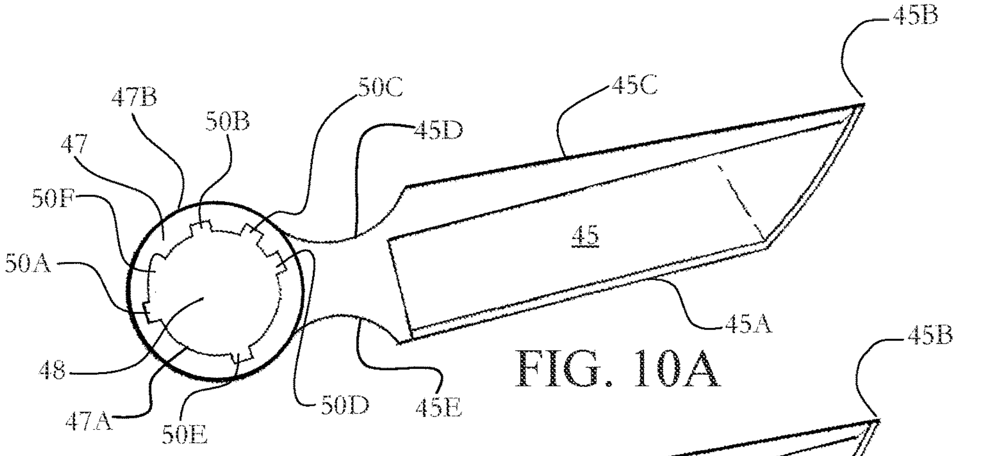
FIG. 10A is a non-limiting example of an alternate internal view of a tool blade with a blade removed according to some embodiments.
Figure 10B:
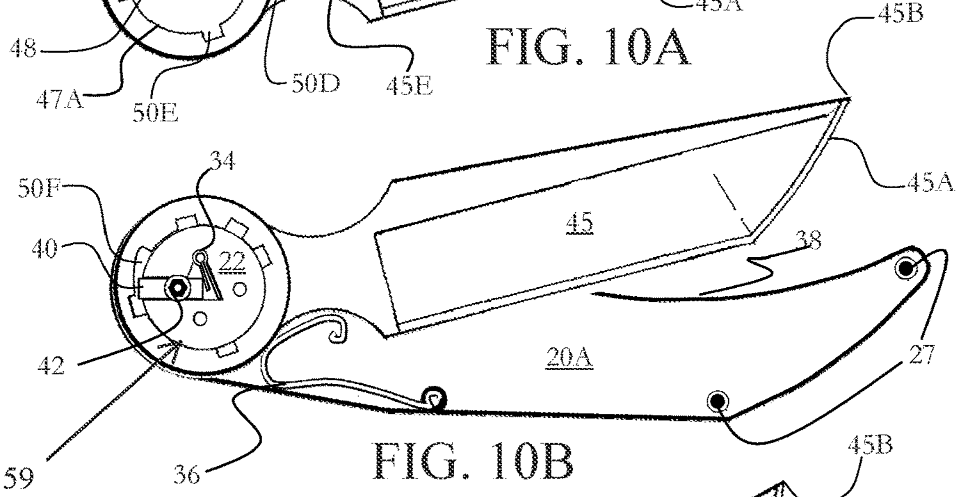
FIG. 10B is a non-limiting example of an alternate internal view of a tool blade according to some embodiments.
Figure 10C:
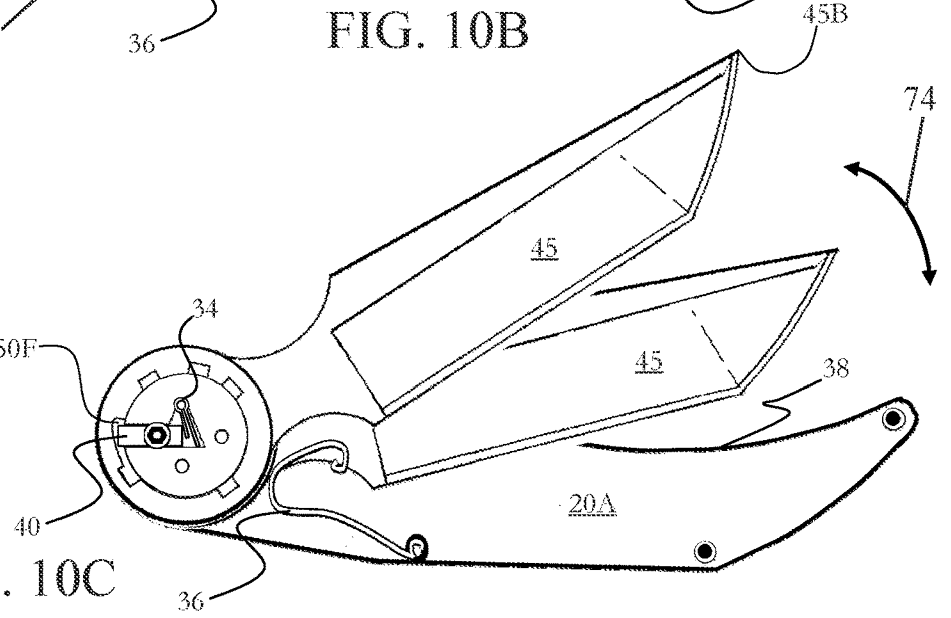
FIG. 10C is a non-limiting example of an alternate internal view of a tool blade showing simulated movement of a blade according to some embodiments.
Figure 10D:
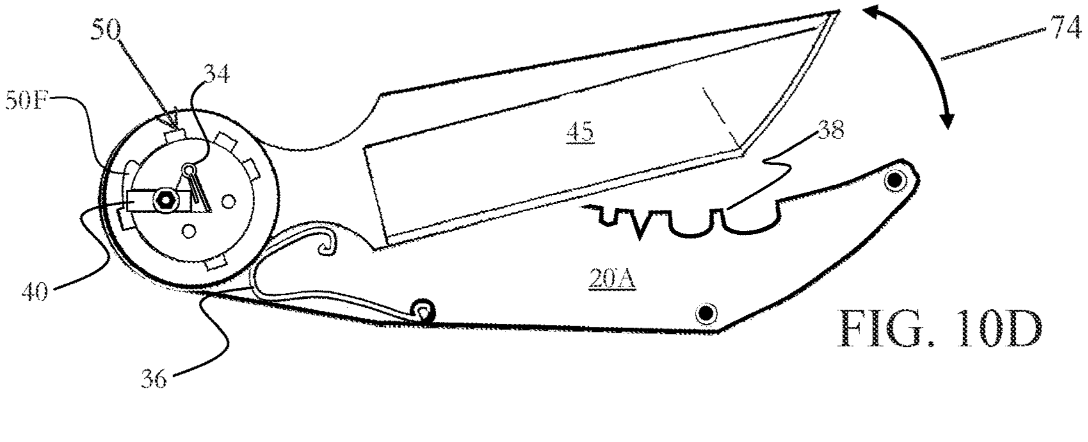
FIG. 10D is a non-limiting example of an alternate internal view of a tool blade showing simulated movement of a blade according to some embodiments.

As shown in FIGS. 10A, 10B, 10C, and 10D, embodiments may include a different blade and handle shape and style and may demonstrate forms and functions described herein with the addition of a locking groove (50F) which may be an elongated locking groove or pocket or the like. A locking groove (50F) may allow for limited movement in a locking position and may provide additional methods of use and may create new tools. Such embodiments may form a scissor action method of use. This limited motion may increase blade uses as a tool for such things as a letter opener, seatbelt cutter, wire stripper, cigar trimer or other uses where movement of a blade would be useful. FIG. 10A shows a blade (45) removed to make a locking groove (50F) clearer to see. FIGS. 10B, 10C and 10D show an example of a moveable component (40) making contact with a locking groove (50F) which may provide for some movement. FIGS. 10C and 10D shows a non-limiting example of a simulated movement of blade (45). FIG. 10C shows the up and down movement of blade (45) in relationship to the moveable component (40) being engaged into a grove (50F). FIG. 10C shows a smooth or plain edge of handle edge (38) where a sharpened or sheer inside edge may be created and protected from contact with fingers and the hand. FIG. 10D shows a handle edge (38) which may include notches, grooves, cut outs and the like to provide for different interactions with the blade (45A), which may create new and useful tools which may include: scissors, seat belt cutter, letter opener, wire striper, wire cutter, cigar trimmer, scoring device, plastic/composite handcuff cutter, game skinning tool, gutting tool for fish and fowl and other uses.

FIGS. 10A, 10B, 10C, and 10D is a non-limiting example of an alternate internal view of a tool blade according to some embodiments. A blade (45) is shown with a groove (50F) which may allow limited movement (74) of a blade (45) perhaps while making contact with a tensioning mechanism (36) such as a spring bias release. In this embodiment, the technology may form a scissor action method of use. This motion may increase the blade's uses as a tool for such things as a letter opener, seatbelt cutter, wire stripper, cigar trimer, or other uses where movement of a blade may be useful. FIG. 10A shows a blade (45) removed to make a grove (50F) clearer to see. FIGS. 10B, 10C and 10D shows a moveable component (40) making contact with a grove (50F) which provides for some movement. FIGS. 10C and 10D shows a simulated movement of a blade (45). FIG. 10C shows the up and down movement of a blade (45) in relationship to a moveable component (40) being engaged into a groove (50F). FIG. 10C shows a smooth or plain edge of handle edge (38) where a sharpened or sheer inside edge may be created and protected from contact, perhaps with fingers and the hand. FIG. 10D shows a handle edge (38) may include notches, grooves, cut outs and the like to provide for different interactions with the blade (45A). These interactions and uses may include: scissors, seat belt cutter, letter opener, wire striper, wire cutter, cigar trimmer, scoring device, plastic/composite handcuff cutter, game skinning tool, gutting tool for fish and fowl and other uses.

Figure 11A:
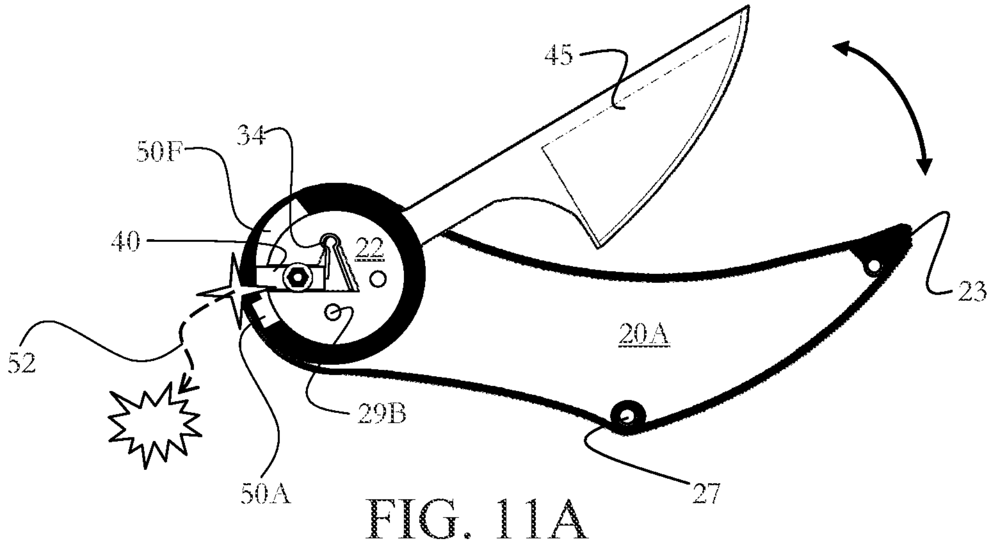
FIG. 11A is a non-limiting example of an alternate internal view of a tool blade according to some embodiments.
Figure 11B:
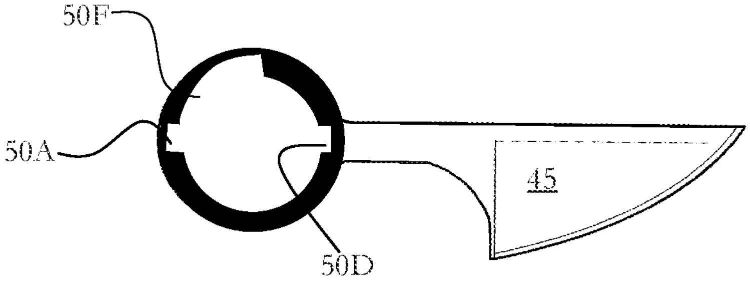
FIG. 11B is a non-limiting example of an alternate internal view of a tool blade with a blade removed according to some embodiments.

As shown in FIGS. 11A and 11B, embodiments of the disclosure may include a locking groove (50F) being made from a material that can cause sparks from friction with a spring bias lock mechanism (59) and a moveable component (40). Sparks (52) are a simulation of the reaction created by friction between a moveable component (40) and a locking groove (50F).

FIGS. 11A and 11B is a non-limiting example of an alternate internal view of a tool blade according to some embodiments showing how the interaction between a moveable component (40) and a groove (50F) may be made of material or coated with material that may create sparks from friction as a fire starter and/or survival tool. A handle or parts of a handle (20A, 20B) may be configured in a way as to allow sparks to escape from a groove (50F) which may be a friction chamber pocket perhaps by the addition of a small window in handle. FIG. 11B shows a blade (45) removed to give a better view of a groove (50F). A spark (52) may escape a friction chamber and start a fire.

Figure 12A:
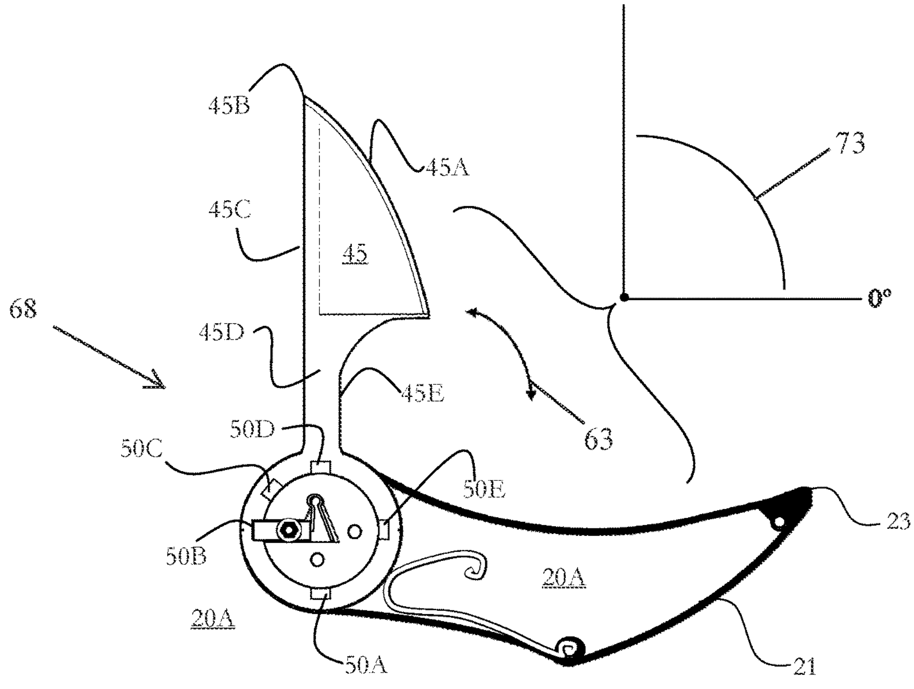
FIG. 12A is a non-limiting example of an alternate internal view of a tool blade according to some embodiments.
Figure 12B:
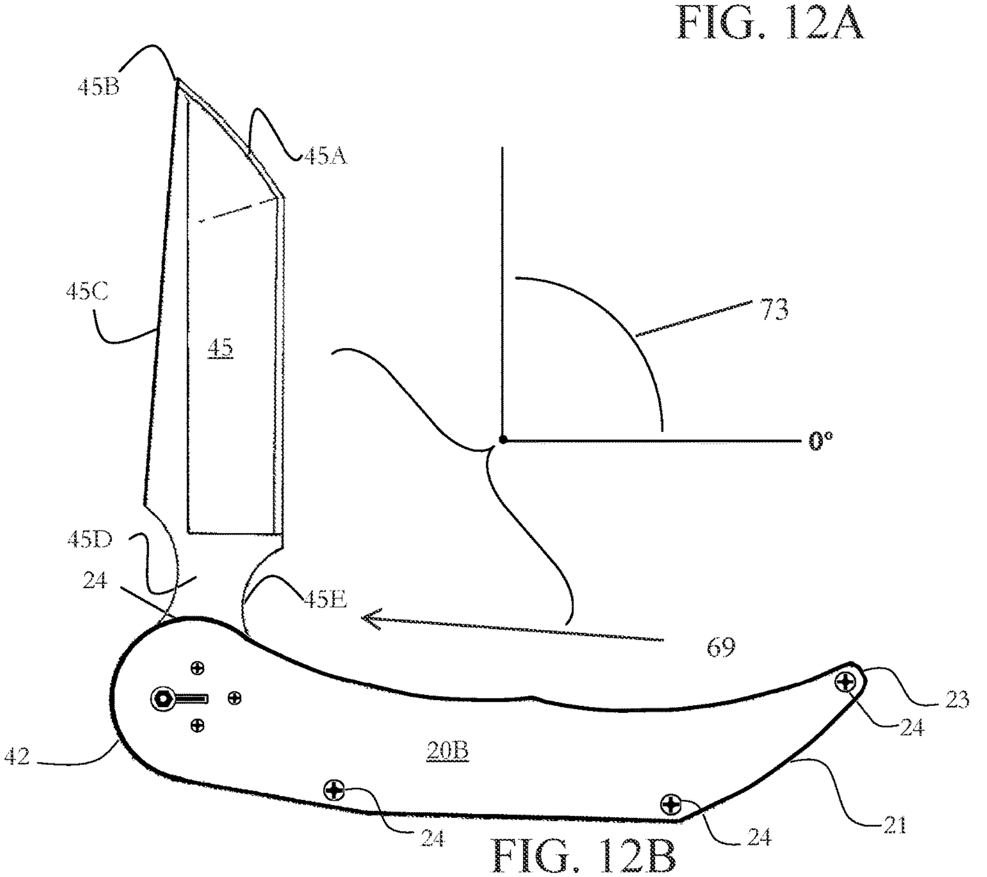
FIG. 12B is a non-limiting example of an alternate external view of a tool blade according to some embodiments.

FIGS. 12A and 12B are non-limiting examples of an alternate internal view (FIG. 12A) of a tool according to some embodiments and an external view (FIG. 12B) of a tool blade according to some embodiments. FIGS. 12A and 12B show tool blades where a blade may be radially moveable (63) around a disk and with respect to a handle and may be locked at angles (73) that are, for example, between about 90 to about 95 degrees (but any angle can be used), other angles may be applied as desired. These angles may correspond with various methods of use; for example, FIG. 12A shows a configuration that may be used as a self-defense tool with a self defense angle (68) whereas FIG. 12B shows a configuration that may be used for scoring, opening cardboard boxes and other methods of use perhaps with a cutting angle (69).

As shown in FIGS. 12A and B embodiments of the disclosure show a blade-(45)-to-handles (20) angle (73) of, for example, about 90 to about 96 degrees which may correspond with methods of use as a self-defense tool. This configuration may make tasks of cutting, slicing, stabbing more ergonomically comfortable and safe for a wide variety of other tasks as well. FIGS. 12A and 12B show different styles of blade (45) and handles (20) that may be used and demonstrates that the shape, size and style of the blade (45) and handles (20) can be varied and are not meant to be limited.

Figure 13A:
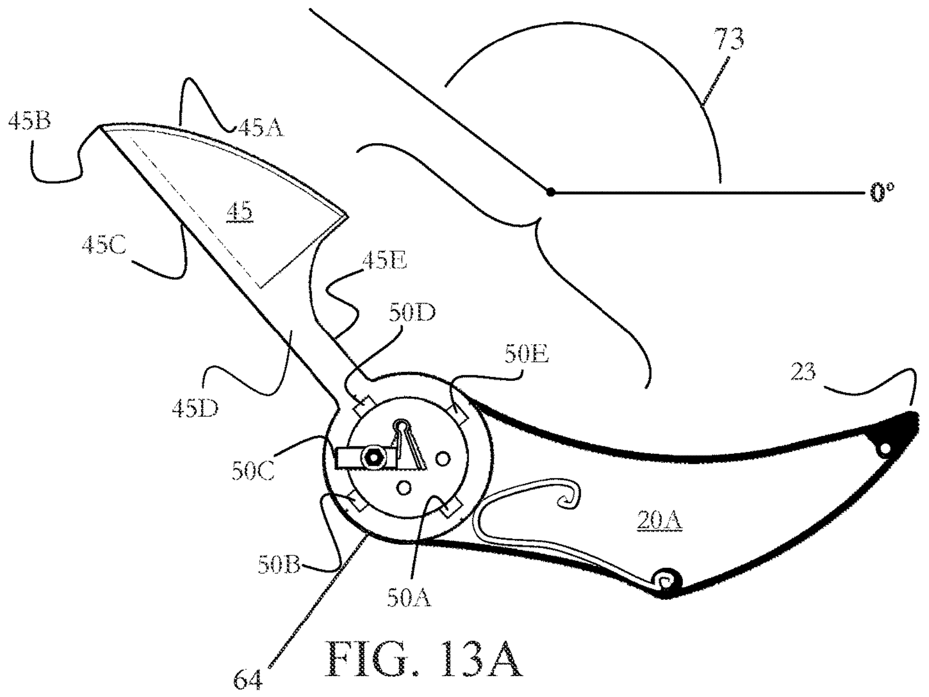
FIG. 13A is a non-limiting example of an alternate internal view of a tool blade according to some embodiments.
Figure 13B:
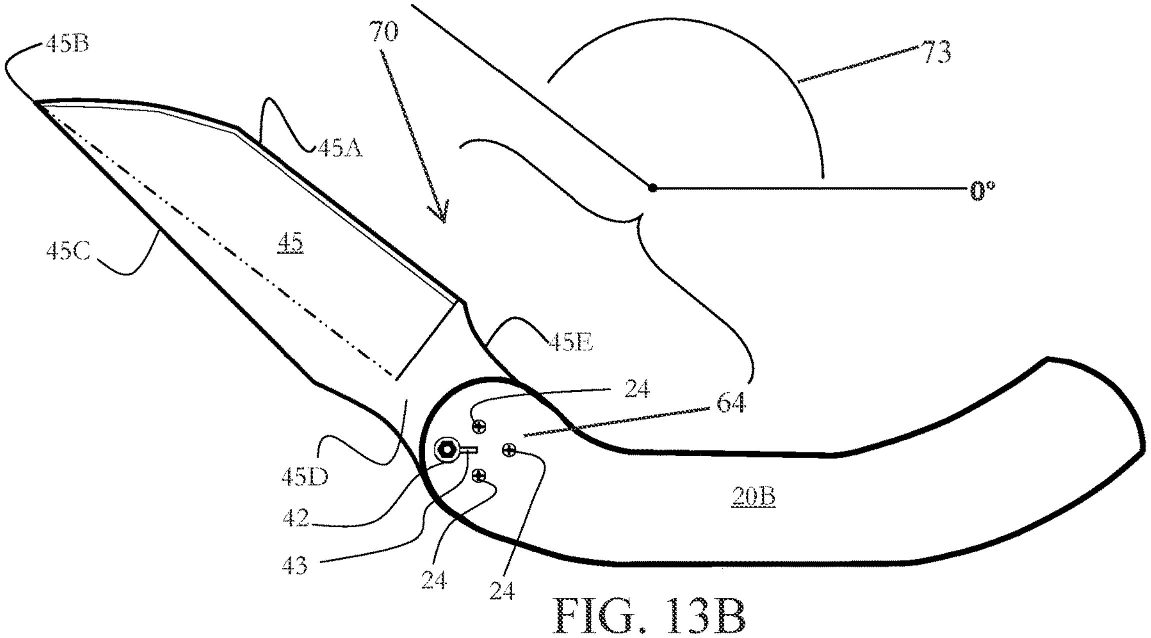
FIG. 13B is a non-limiting example of an alternate external view of a tool blade according to some embodiments.

As shown in FIGS. 13A and 13B, embodiments of the disclosure include a blade (45) positional to handles (20) at an angle (73) of, for example, about 125 degrees to about 138 degrees (but any angle can be used) which may correspond with a survival angle (70) methods of use as a self-defense tool and as hunting, skinning, gutting tool, or the like. This configuration may make tasks of cutting, slicing, stabbing more ergonomically comfortable and safe for a wide variety of other tasks as well. FIGS. 13A and 13B show different styles of blade (45) and handles (20) that may be used. These are shown to demonstrate that the shape, size and style of the blade (45) and handles (20) may vary and are not meant to be limited.

FIGS. 13A and 13B are non-limiting example of an alternate internal view of a tool according to some embodiments including an alternate internal view (FIG. 13A) and an external view (FIG. 13B). Tool blades may be locked at angles (73) that are, for example, between about 125 to about 138 degrees. These angles may correspond with various methods of use. FIG. 13A shows a configuration that may be used as a self-defense tool for slashing or stabbing from a reverse grip position in the user's hand whereas FIG. 13B shows a configuration that may be used for skinning and dressing game at an angle which may prevent puncturing of a game animals bowls.

Figure 14A:
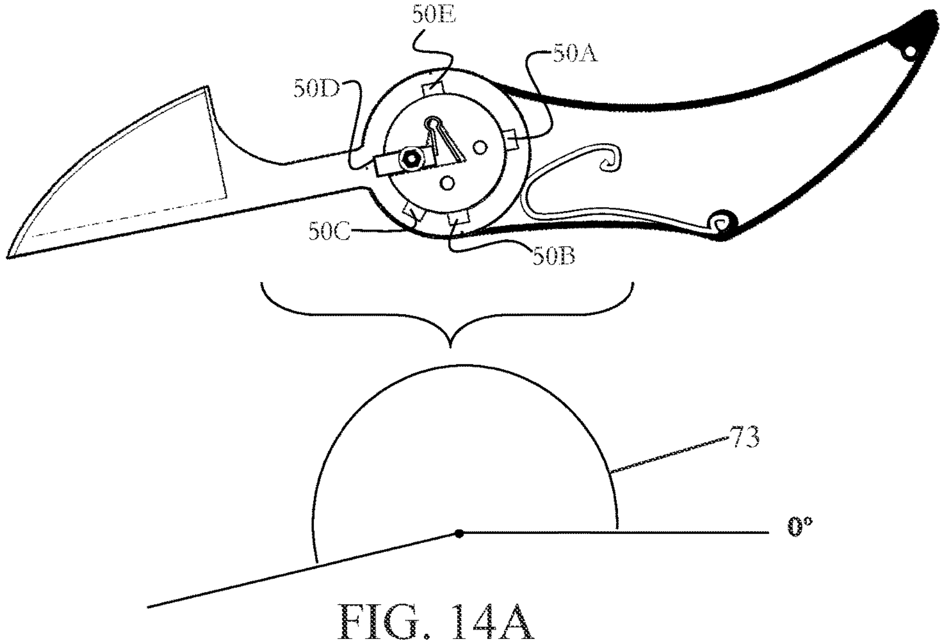
FIG. 14A is a non-limiting example of an alternate internal view of a tool blade according to some embodiments.
Figure 14B:
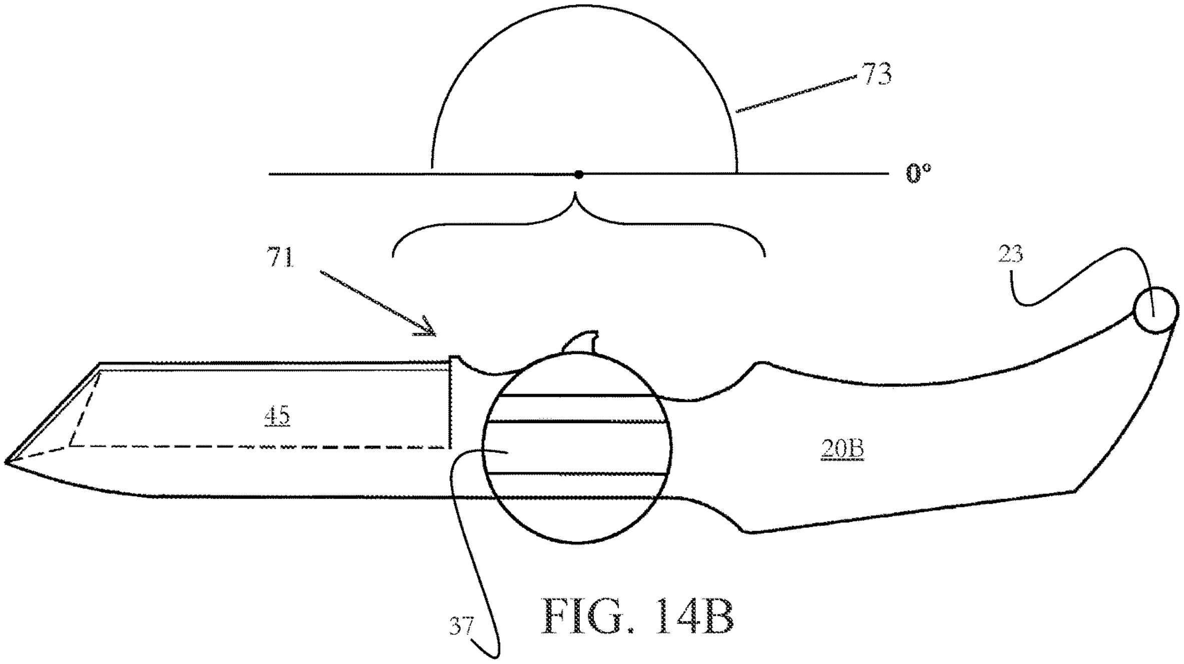
FIG. 14B is a non-limiting example of an alternate external view of a tool blade according to some embodiments.

As shown in FIGS. 14A and 14B, embodiments of the disclosure may include a blade (45) positional to handles (20) at an angle (73) of, for example, about 190 to about 195 degrees (but any angle can be used) which will correspond with methods of use as a self-defense tool and as hunting, skinning, gutting tool. FIG. 14B shows a blade (45) positional to handles (20) at an angle of, for example, about 170 to about 180 degrees (but any angle can be used). This angle which may be a straight position (71) may be a fairly common angle for lock blade knives and is shown to demonstrate that common embodiments are not meant to be limited from one of the uses or configurations. FIGS. 14A and 14B show different styles of blade (45) and handles (20) that may be used. These are shown to demonstrate that the shape, size and style of the blade (45) and handles (20) is not meant to be limited. FIG. 14B provides a circular base including a rounded edge (37) of handles (20A and 20B) which may be made to accommodate a thumb rest and improved grip for various actions. A rounded edge (37) may also be used as a less-than-lethal self-defense tool when the blade is in the closed position (66). The circular end of a handle (20) and rounded edge (37) may also be used as part of a design that combines form and function. A rounded edge (37) may contain company logos, artwork, crests, badges or words.

Figure 18A:
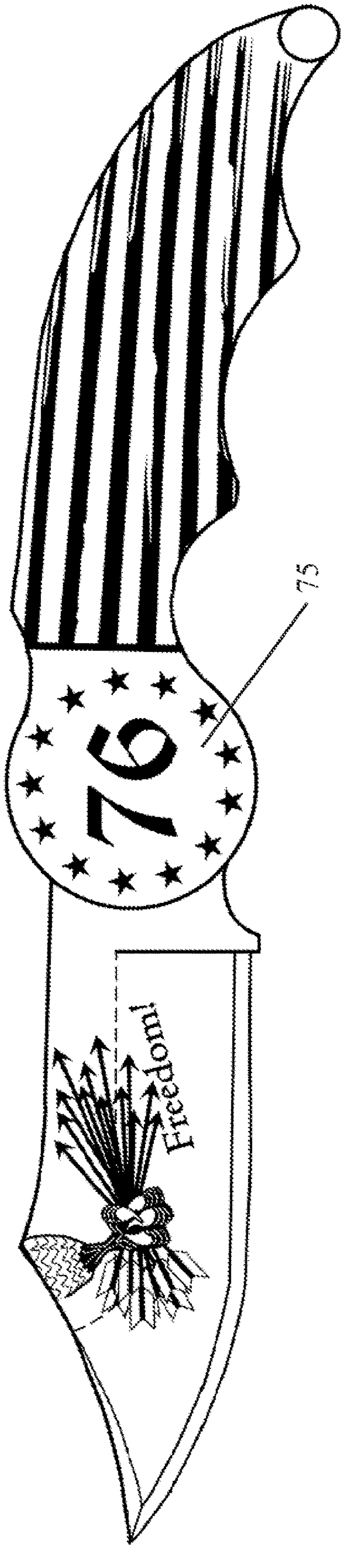
FIG. 18A is a non-limiting example of a side view of a tool blade with a design according to some embodiments.
Figure 18B:
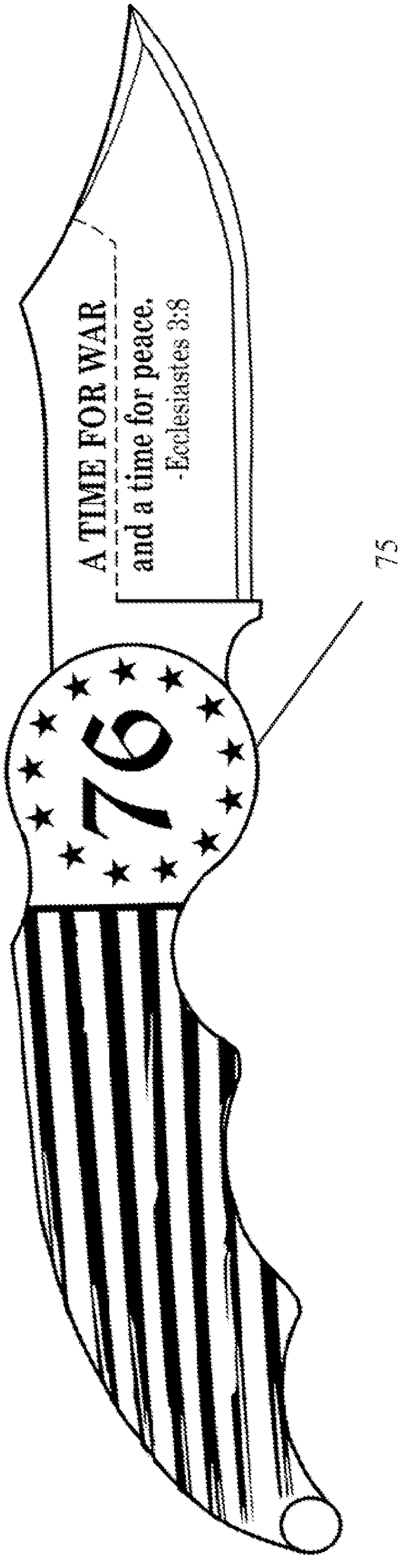
FIG. 18B is a non-limiting example of a side view of a tool blade with a design according to some embodiments.

FIGS. 14A and 14B provide a non-limiting example of an alternate internal view (FIG. 14A) and an external view (FIG. 14B) of a tool according to some embodiments. FIG. 14A shows tool blades that may be locked at angles (73) that are, for example, between about 190 to about 195 degrees. These angles may correspond with various methods of use. For example, FIG. 14A shows a configuration that may be used as a self-defense tool for stabbing and/or ripping whereas FIG. 14B shows a configuration that may be used for cutting, stabbing, sawing, slicing and other methods of use. FIG. 14B shows a tool blade that may be able to be locked at, for example, between about 170 to about 180 degrees. Additionally, FIG. 14B shows a rounded edge (37) which can be part of a full circle design on the end of handles (20A) and (20B) which may act as a kind of guard to prevent fingers and hands from coming in contact with the blade while at the same time providing a larger space for locking parts such as those listed as (22), (34) and (40). A larger rounded end (37) may also provide a less-than-lethal striking weapon when a blade (45) is in the closed position. A rounded edge may be used as a face buster, rib breaker, groin smasher, or the like. A rounded edge (37) may also be used as part of a design that may combine form and function such as with a design, pattern, logo, name, crests, or the like as shown in FIGS. 18A and 18B as non-limiting examples. FIGS. 18A and 18B show a non-limiting example of a design portion (75) of a tool. Such design portion may provide a space on a tool to add patterns, artwork, logos, designs, names, crests or the like. This may even provide texture for a user to grasp a tool when held and used. A design portion may provide a dual use of adding texture and graphic to a tool and a design portion may be located at an end of a handle enclosing a blade. A design portion may be rounded or may be other shapes. Of course, a design portion (75) may be placed at any part of a tool including any portion of a handle or blade.

Figure 15A:
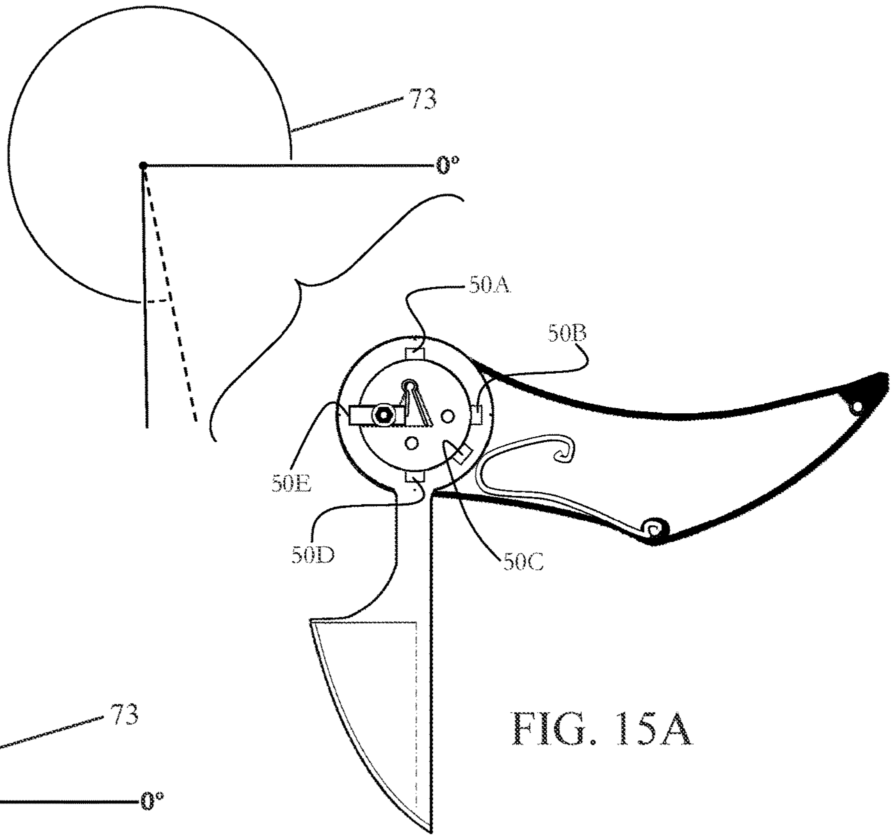
FIG. 15A is a non-limiting example of an alternate internal view of a tool blade according to some embodiments.
Figure 15B:
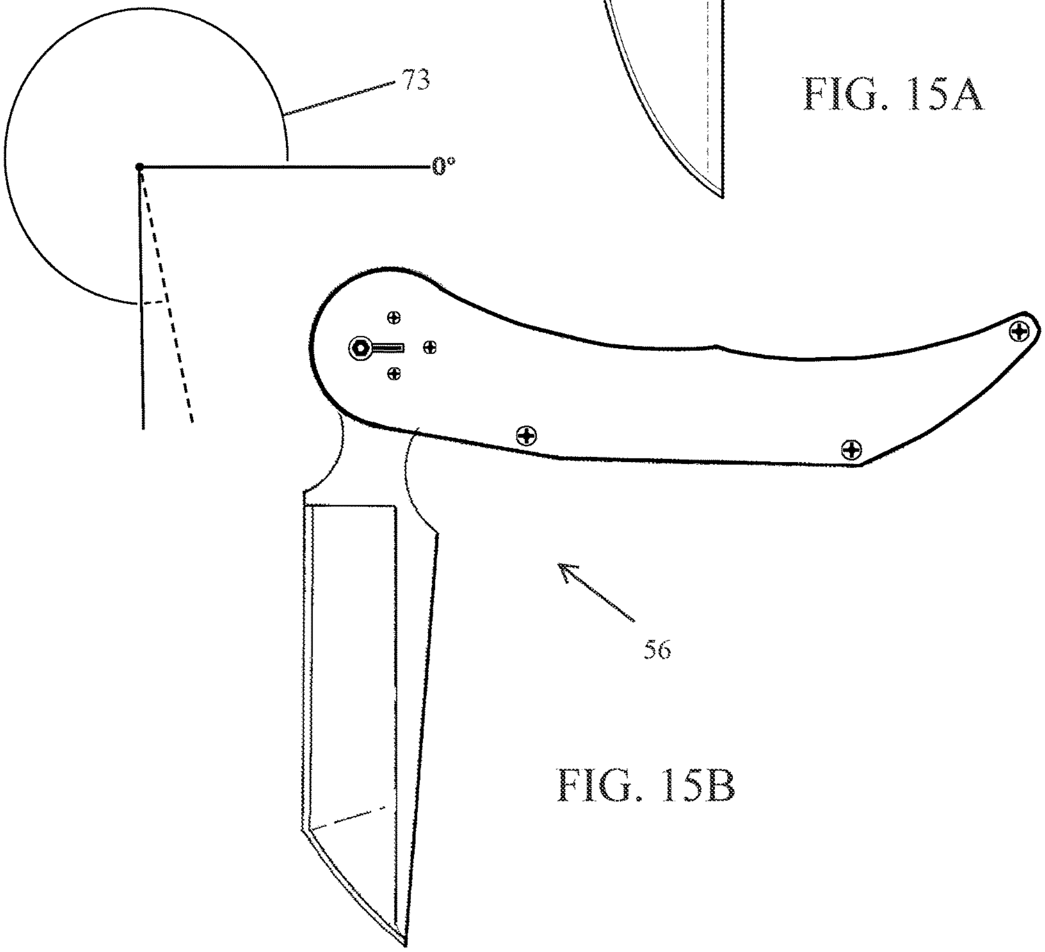
FIG. 15B is a non-limiting example of an alternate external view of a tool blade according to some embodiments.

As shown in FIGS. 15A and 15B, embodiments of the disclosure may provide a blade (45) positional to handles (20) at a non-limiting exemplary angle (73) of approximately about 260 to about 280 degrees (but any angle can be used) which may correspond with methods of use as a self-defense tool and as hunting, skinning, scraping or chopping tool. This configuration may make tasks of cutting, slicing, chopping and stabbing more ergonomically comfortable and safe for a wide variety of other tasks as well.

FIGS. 15A and 15B provide a non-limiting example of an alternate internal view (FIG. 15A) and an external view (FIG. 15B) of a tool blade according to some embodiments. FIGS. 15A and 15B show that blades that may be locked at angles (73) between, for example, about 260 to about 280 degrees (but any angle can be used). These angles may correspond with various methods of use; for example, FIG. 15A shows a configuration that may be used as a self-defense tool when used in a reverse grip hammer first striking method whereas FIG. 15B shows a configuration that may be used for chopping, cleaving, draw-cutting and other methods of use. A blade may be placed in multiple positions and each position may be a secured position (72). Any position or angle of a blade with respect to a handle may be used for various purposes such as but not limited to a survival angle (70), a game skinning angle, a self defense angle (68), a craftsmanship angle, a cutting angle (69), a saw blade angle, a closed position (66), an open position (67), a straight position (71) or the like and all angles and positions are included and can be combined in any combination or permutation.

Figure 16:
FIG. 16 is a non-limiting example of an alternate view of a tool blade in a user's hand according to some embodiments.

FIG. 16 is a non-limiting example of an alternate view of a tool blade in a user's hand according to some embodiments. FIG. 16 demonstrates a method of use that corresponds with the angle shown in FIG. 12A. Embodiments of the disclosure may show one method of use as a self-defense tool. FIG. 16 shows a person in a dangerous strangle hold by an attacker. The defender may grab the attacker's arm with one hand to preserve the airway and may use their free hand to deploy the locking blade (45). FIG. 12A is demonstrated in this picture with a blade (45) in an exemplary 90-degree angle configuration. With handles (20) firmly gripped in her first the defender may be able to stab blade (45) into the nerves, tendons, tissue, and cartilage of the attacker's elbow which may cause an immediate and involuntary release of the strangle hold. The defender also has the option of delivering a hammer first strike downward to the attacker's groin, pelvis area or thigh where the pressure point end (23) may cause distraction, pain, and or damage. Many more methods of use may be claimed and described for different types of attacks.

Figure 17:
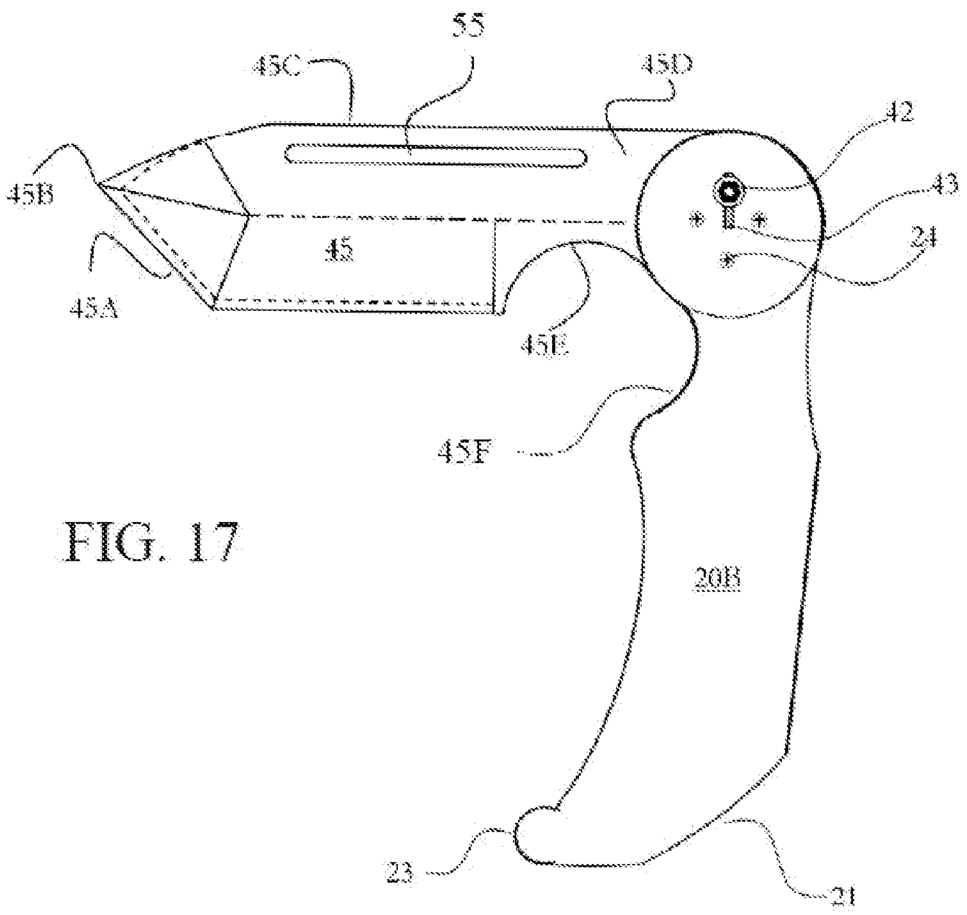
FIG. 17 provides a non-limiting example of an alternative embodiment of a tool blade.

FIG. 17 provides a blade groove (55) and even a finger grip groove (45F) which may create space for a user's finger(s) to rest that may be near a blade. A blade groove (55) can be a groove, cut out, hole, or the like and may be any shape, size, and length perhaps for use with assistance in opening and/or also known as a blood groove.

As can be easily understood from the foregoing, the basic concepts of the various embodiments of the present invention(s) may be embodied in a variety of ways. It involves both techniques for using a rotating tool as well as devices to accomplish the appropriate rotating tool methods. In this application, the rotating tool techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified). In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention (s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "fold" should be understood to encompass disclosure of the act of "folding"—whether explicitly discussed or not—and, conversely, were there effectively disclosure of the act of "folding", such a disclosure should be understood to encompass disclosure of a "fold" and even a "means for folding." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, references listed in an information statement filed with the application are hereby appended and hereby incorporated by reference, however, as to each of the above, to the extent that such information or statements incorporated by reference might be considered inconsistent with the patenting of the various embodiments of invention (s) such statements are expressly not to be considered as made by the applicant(s).

Thus, the applicant(s) should be understood to have support to claim and make claims to embodiments including at least: i) each of the tool devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim* v. *Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 10 or any other claim" or the like, it could be re-drafted as dependent on claim 1, claim 2, or even claim 5 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A rotatable tool comprising:

a handle;

a blade having an exposed blade end portion and a handle attachable unexposed end portion;

a cutout in said handle attachable unexposed end portion of said blade;

at least one locking groove placed around said cutout in said handle attachable unexposed end portion of said blade;

a spring bias lock mechanism located in said cutout in said handle attachable unexposed end portion of said blade;

wherein said spring bias lock mechanism comprises a spring and a moveable component so that said moveable component is engaged in said at least one locking groove to provide a secured blade position on said handle;

a disk capable of housing said spring bias lock mechanism, wherein said disk is attached to said handle and located in said cutout;

an unlock mechanism having an attachment connected to said moveable component to disengage said moveable component from said locking groove; and a spring bias release positioned against at least part of said blade to spring said blade open from said secured blade position with respect to the handle when said user activated unlock mechanism is activated.

2. The rotatable tool as described in claim 1 wherein said at least one locking groove comprises at least two locking grooves placed around said cutout in said handle attachable unexposed end portion of said blade.

3. The rotatable tool as described in claim 2 wherein said cutout comprises a circular cutout and wherein said at least two locking grooves are radially placed around said circular cutout in said handle attachable unexposed end portion of said blade.

4. The rotatable tool as described in claim 2 wherein said spring bias release when activated is configured to radially move said blade to a different position with respect to said handle so that said moveable component is secured into a second locking groove of the at least two locking grooves.

5. The rotatable tool as described in claim 1 wherein said securement of said moveable component into said at least one locking groove of said handle attachable unexposed end portion of said blade comprises said spring biasing against said moveable component in said at least one locking groove.

6. The rotatable tool as described in claim 1 wherein said attachment connected to said moveable component is configured to allow a user to move said attachment which moves said moveable component.

7. The rotatable tool as described in claim 6 wherein said activated unlock mechanism is user accessible from outside of said handle.

8. The rotatable tool as described in claim 1 wherein said spring bias release of said blade comprises a tensioning mechanism biasing against part of said blade.

9. The rotatable tool as described in claim 1 and further comprising a spark igniter in said tool.

10. The rotatable tool as described in claim 9 wherein said spark igniter is part of said spring bias lock mechanism.

11. A method for adjusting a tool comprising the steps of:

providing a blade having an exposed blade end portion and a handle attachable unexposed end portion;

providing a cutout and at least one locking groove placed around said cutout inside said handle attachable unexposed end portion of said blade;

providing a handle connected to said blade;

providing a spring bias mechanism located in said cutout inside said handle attachable unexposed end portion of said blade, wherein said spring bias lock mechanism comprises a spring and a moveable component;

securing said moveable component with force from said spring into said at least one locking groove so that said blade is in a first secured position relative to said handle;

a disk capable of housing said spring bias lock mechanism, wherein said disk is attached to said handle and located in said cutout;

providing an unlock mechanism having an attachment connected to said moveable component, part of which is accessible by a user from outside of said handle, wherein when said unlock mechanism is activated by said user, said unlock mechanism unlocks said blade from said first secured position by disengaging said movable component from said locking groove;

when unlocked, springing said blade from said first secured position to a different position.

12. The method as described in claim 11 wherein said step of providing said cutout and said at least one locking groove comprises the step of providing a circular cutout and at least two locking grooves radially placed around said circular cutout in said handle attachable unexposed end portion of said blade.

13. The method as described in claim 12 wherein said step of providing a circular cutout and at least two locking grooves comprises the step of providing said circular cutout and at least three locking grooves radially placed around an inside of said cutout.

14. The method as described in claim 11 wherein said step of springing said blade from said first secured position comprises a step of radially moving said blade with respect to said handle.

* * * * *